(12) United States Patent
Abecassis et al.

(10) Patent No.: US 9,615,142 B2
(45) Date of Patent: Apr. 4, 2017

(54) SECOND SCREEN TRIVIA FUNCTION

(71) Applicants: Max Abecassis, Boca Raton, FL (US);
Ryan M. Donahue, Boynton Beach, FL (US)

(72) Inventors: Max Abecassis, Boca Raton, FL (US);
Ryan M. Donahue, Boynton Beach, FL (US)

( * ) Notice: Subject to any disclaimer, the term of this patent is extended or adjusted under 35 U.S.C. 154(b) by 94 days.

(21) Appl. No.: 14/531,051

(22) Filed: Nov. 3, 2014

(65) Prior Publication Data

US 2015/0110458 A1    Apr. 23, 2015

Related U.S. Application Data

(60) Division of application No. 14/527,280, filed on Oct. 29, 2014, which is a continuation-in-part of
(Continued)

(51) Int. Cl.
*H04N 9/80* (2006.01)
*H04N 7/16* (2011.01)
(Continued)

(52) U.S. Cl.
CPC ....... *H04N 21/8133* (2013.01); *G11B 27/005* (2013.01); *G11B 27/11* (2013.01);
(Continued)

(58) Field of Classification Search
None
See application file for complete search history.

(56) References Cited

U.S. PATENT DOCUMENTS 5,596,705 A  1/1997  Reimer et al.
5,809,471 A  9/1998  Brodsky
(Continued)

FOREIGN PATENT DOCUMENTS

EP    2685740 A1    1/2014

OTHER PUBLICATIONS

"Amazon announces X-Ray for Movies, a Kindle feature that uses IMDB to name the actors for you" by Dana Wollman, http://www.engadget.com/2012109106/amazon-announces-x-ray-for-movies-a-kindle-feature-that-uses-im/ Downloaded Oct. 29, 2014.
(Continued)

*Primary Examiner* — Heather Jones

(57) ABSTRACT

Systems for, and methods of, displaying video information comprising: a second screen device obtaining current play position data of a video being played on a primary screen device (e.g., obtaining from the primary screen device an identification of a current play position of the video, or obtaining information to generate an acoustic fingerprint of the video); determining a current play position of the video playing on the primary screen device based upon the current play position data (e.g., identification of the current play position or the acoustic fingerprint); downloading information (e.g., video map, subtitles, moral principles, objectionable content, memorable content, performers, geographical maps, shopping, plot point, item, ratings, and trivia information) over a computer communications network into the memory of the second screen device; and displaying information on the second screen device synchronized with the contemporaneously played video on the primary screen device.

20 Claims, 13 Drawing Sheets

Related U.S. Application Data application No. 13/964,176, filed on Aug. 12, 2013, now Pat. No. 9,135,955, which is a continuation-in-part of application No. 13/506,093, filed on Mar. 26, 2012.

(51) Int. Cl.

| | |
|---|---|
| *H04N 21/81* | (2011.01) |
| *H04N 21/43* | (2011.01) |
| *G11B 27/22* | (2006.01) |
| *G11B 27/34* | (2006.01) |
| *H04N 21/41* | (2011.01) |
| *H04N 21/8547* | (2011.01) |
| *H04N 7/24* | (2011.01) |
| *G11B 27/00* | (2006.01) |
| *H04N 21/435* | (2011.01) |
| *H04N 21/472* | (2011.01) |
| *G11B 27/11* | (2006.01) |
| *G11B 27/28* | (2006.01) |
| *H04N 21/4722* | (2011.01) |
| *H04N 21/8352* | (2011.01) |
| *H04N 21/845* | (2011.01) |
| *H04N 21/8549* | (2011.01) |
| *H04N 21/475* | (2011.01) |
| *H04N 21/488* | (2011.01) |
| *H04N 21/478* | (2011.01) |
| *H04N 21/439* | (2011.01) |

(52) U.S. Cl.
CPC ............ *G11B 27/22* (2013.01); *G11B 27/28* (2013.01); *G11B 27/34* (2013.01); *H04N 7/24* (2013.01); *H04N 21/4122* (2013.01); *H04N 21/4126* (2013.01); *H04N 21/435* (2013.01); *H04N 21/4307* (2013.01); *H04N 21/4722* (2013.01); *H04N 21/47217* (2013.01); *H04N 21/8352* (2013.01); *H04N 21/8455* (2013.01); *H04N 21/8547* (2013.01); *H04N 21/8549* (2013.01); *H04N 21/439* (2013.01); *H04N 21/4755* (2013.01); *H04N 21/4756* (2013.01); *H04N 21/4758* (2013.01); *H04N 21/4781* (2013.01); *H04N 21/47815* (2013.01); *H04N 21/4884* (2013.01)

(56) References Cited

U.S. PATENT DOCUMENTS

| | | | |
|---|---|---|---|
| 6,263,505 B1 | 7/2001 | Walker et al. | |
| 6,408,128 B1 | 6/2002 | Abecassis | |
| 6,577,346 B1 | 6/2003 | Perlman | |
| 6,889,383 B1 | 5/2005 | Jarman | |
| 7,430,360 B2 | 9/2008 | Abecassis | |
| 7,826,713 B2 | 11/2010 | Kim et al. | |
| 7,899,915 B2 | 3/2011 | Reisman | |
| 7,975,021 B2 | 7/2011 | Jarman et al. | |
| 8,009,861 B2 | 8/2011 | Lu et al. | |
| 8,117,282 B2 | 2/2012 | Jarman et al. | |
| 8,150,165 B2 | 4/2012 | Melikian | |
| 8,373,723 B2 | 2/2013 | Park et al. | |
| 8,374,387 B2 | 2/2013 | Lienhart et al. | |
| 8,402,500 B2 | 3/2013 | Walker et al. | |
| 8,424,037 B2 | 4/2013 | Landow et al. | |
| 8,494,346 B2 | 7/2013 | Abecassis | |
| 8,516,528 B2 | 8/2013 | Sandoval et al. | |
| 8,516,533 B2 | 8/2013 | Davis et al. | |
| 8,645,991 B2 | 2/2014 | McIntire et al. | |
| 2003/0037068 A1 | 2/2003 | Thomas et al. | |
| 2003/0093790 A1 | 5/2003 | Logan et al. | |
| 2003/0206710 A1 | 11/2003 | Ferman et al. | |
| 2004/0196570 A1 | 10/2004 | Nurishi | |
| 2004/0261125 A1* | 12/2004 | Ellis .................. H04N 5/44543 725/133 |
| 2005/0008328 A1 | 1/2005 | Kawa et al. | |
| 2006/0051063 A1 | 3/2006 | Kim et al. | |
| 2007/0250848 A1 | 10/2007 | Gorti et al. | |
| 2007/0250901 A1 | 10/2007 | McIntire et al. | |
| 2008/0022300 A1 | 1/2008 | Angiolillo et al. | |
| 2008/0126191 A1 | 5/2008 | Schiavi | |
| 2009/0102848 A1 | 4/2009 | Park et al. | |
| 2009/0327894 A1 | 12/2009 | Rakib et al. | |
| 2011/0289532 A1* | 11/2011 | Yu ...................... H04N 21/4126 725/38 |
| 2012/0151509 A1 | 6/2012 | McCarthy et al. | |
| 2012/0210349 A1* | 8/2012 | Campana ................ G06F 3/147 725/32 |
| 2013/0007793 A1 | 1/2013 | Anthru et al. | |
| 2013/0014155 A1 | 1/2013 | Clarke et al. | |
| 2013/0061267 A1 | 3/2013 | Cansino et al. | |
| 2013/0097643 A1 | 4/2013 | Stone et al. | |
| 2013/0111514 A1 | 5/2013 | Slavin et al. | |
| 2013/0151534 A1 | 6/2013 | Luks et al. | |
| 2013/0183021 A1* | 7/2013 | Osman .................... H04N 9/87 386/239 |
| 2013/0251337 A1 | 9/2013 | Abecassis | |
| 2013/0343721 A1 | 12/2013 | Abecassis | |
| 2014/0068665 A1 | 3/2014 | Evans et al. | |
| 2014/0071342 A1 | 3/2014 | Winograd et al. | |
| 2014/0111700 A1 | 4/2014 | Paxinos et al. | |
| 2014/0165112 A1 | 6/2014 | Freeman et al. | |
| 2014/0219630 A1 | 8/2014 | Minder | |
| 2014/0219633 A1 | 8/2014 | Chiu et al. | |

OTHER PUBLICATIONS

"Google Play Movies 'Info Cards' Feature Rolled-Out to All Countries" by Hitesh Arora, Jun. 4, 2014, http://gadgets.ndtv.com/apps/news/google-play-movies-info-cards-feature-rolled-out-to-all-countries-536097 Downloaded Oct. 29, 2014.

"IMDb Movies & TV" by IMDb, https://itunes.apple.com/us/app/imdb-movies-tv/id342792525?mt=8 Downloaded Oct. 29, 2014.

"Apple releases iTunes 11.3, including all-new iTunes Extras for HD movies for Mac and Apple TV" by Christian Zibreg, Jul. 10, 2014. http://www.idownloadblog.com/2014/07/10/itunes-11-3-itunes-extras/ Downloaded Oct. 29, 2014.

"RunPee App Ensures You'll Never Miss Big Scenes at the Movies" by Kate Freeman, Oct. 25, 2012, http://mashable.com/2012/10/25/runpee/ Downloaded Oct. 29, 2014.

"What Is Xbox SmartGlass?" by Casey Chan, http://gizmodo.com/5915553/what-is-xbox-smartglass Downloaded Oct. 29, 2014, http://gizmodo.com/5915553/what-is-xbox-smartglass Downloaded Oct. 29, 2014.

"X-Men Movies Cerebro" by Fox Digital Entertainment, Inc., https://itunes.apple.com/us/app/x-men-movies-cerebro/id869718796?mt=8 Downloaded Oct. 29, 2014.

"Scene It?" Wikipedia http://en.wikipedia.org/wiki/Scene_It%3F Downloaded Nov. 3, 2014.

\* cited by examiner

SECOND SCREEN TRIVIA FUNCTION

RELATED U.S. APPLICATION DATA

This application is a division of patent application Ser. No. 14/527,280, which is a continuation-in-part of patent application Ser. No. 13/964,176, filed Aug. 12, 2013, which is a continuation-in-part of patent application Ser. No. 13/506,093, filed Mar. 26, 2012.

BACKGROUND OF THE INVENTION

1. Field of the Invention

Systems for, and methods of, displaying, on a second screen, during a playing of a video on a primary screen, information relating to a current position in the video. The synchronization of the processing of the information to the playing of the movie on the primary screen comprises, for example, a timecode retrieval from the video or an acoustic fingerprint matching. The processing and/or retrieval of information may be at the second screen, local server, remote server, and or services provider.

2. Description of the Related Art

Systems for, and methods of, displaying on a second screen, during a playing of a video on a primary screen, information relating to a current position in the video are limited in the functions supported and the capabilities and information that are provided the user.

BRIEF SUMMARY OF THE INVENTIONS

The present inventions relate generally to systems and methods for providing supplementary information on a second screen during a playing of a video on a primary screen.

Accordingly, it is an object of the present inventions to, for example, provide user capabilities on a second screen comprising routines for: establishing content preferences without interrupting the viewing by other users of a playing of a video on a primary screen; content previewing that, responsive to a preference with respect to a level of explicitness in one of a plurality of content categories, enables previewing yet to be played segments within a video; enabling the user to search video segments depicting a performer/character having certain physical attributes and performing specified acts; displaying multiple geographical map views responsive to a depicted locale, and for providing linkages to secondary information; displaying plot information and for enabling the user to establish preferences as to a notification with respect to categories of plot information (e.g., disabling notification of clues; identifying moral principles of a moral dilemma depicted in the video, and suggesting moral dilemma questions; displaying multiple website pages of a purchase item depicted in the video; notifying the proximity to a brick and mortar retailer of a product depicted in a video for which the user indicated an interest; the controlled synchronized delay display of subtitles; the identification of the best lines, memorable moments, best performances, and romantic moments in a video and enabling a user to individually rate them and share the ratings with other users; limiting a search of the content of a video that precedes the current play position, displaying an identification of items and trivia questions contemporaneously with a playing of the video on a primary screen; and displaying, responsive to a user's content classification preferences, a notification of suitable points for a snack break.

Briefly, these and other objects are enabled by systems for, and methods of, displaying video information comprising: a second screen device obtaining current play position data from a video being played on a primary screen device (e.g., obtaining from the primary screen device an identification of a current play position of the video, or obtaining audio information to generate an acoustic fingerprint of the video); determining a current play position of the video playing on the primary screen device based upon the current play position data (e.g., identification of the current play position or the acoustic fingerprint); downloading information (e.g., video map, subtitles, moral principles, objectionable content, memorable content, performers, geographical maps, shopping, plot point, item, ratings, and trivia information) over a computer communications network into the memory of the second screen device; and displaying information on the second screen device synchronized with the contemporaneously played video on the primary screen device. These and other embodiments, features, advantages, and objects, are apparent in the context of the detailed description, accompanying drawings, and appended claims that follow.

BRIEF DESCRIPTION OF THE DRAWINGS

The following drawing figures, that form a part of this application, are illustrative of embodiments of the present invention and are not meant to limit the scope of the invention in any manner.

DETAILED DESCRIPTION OF THE INVENTIONS

Figure 1:
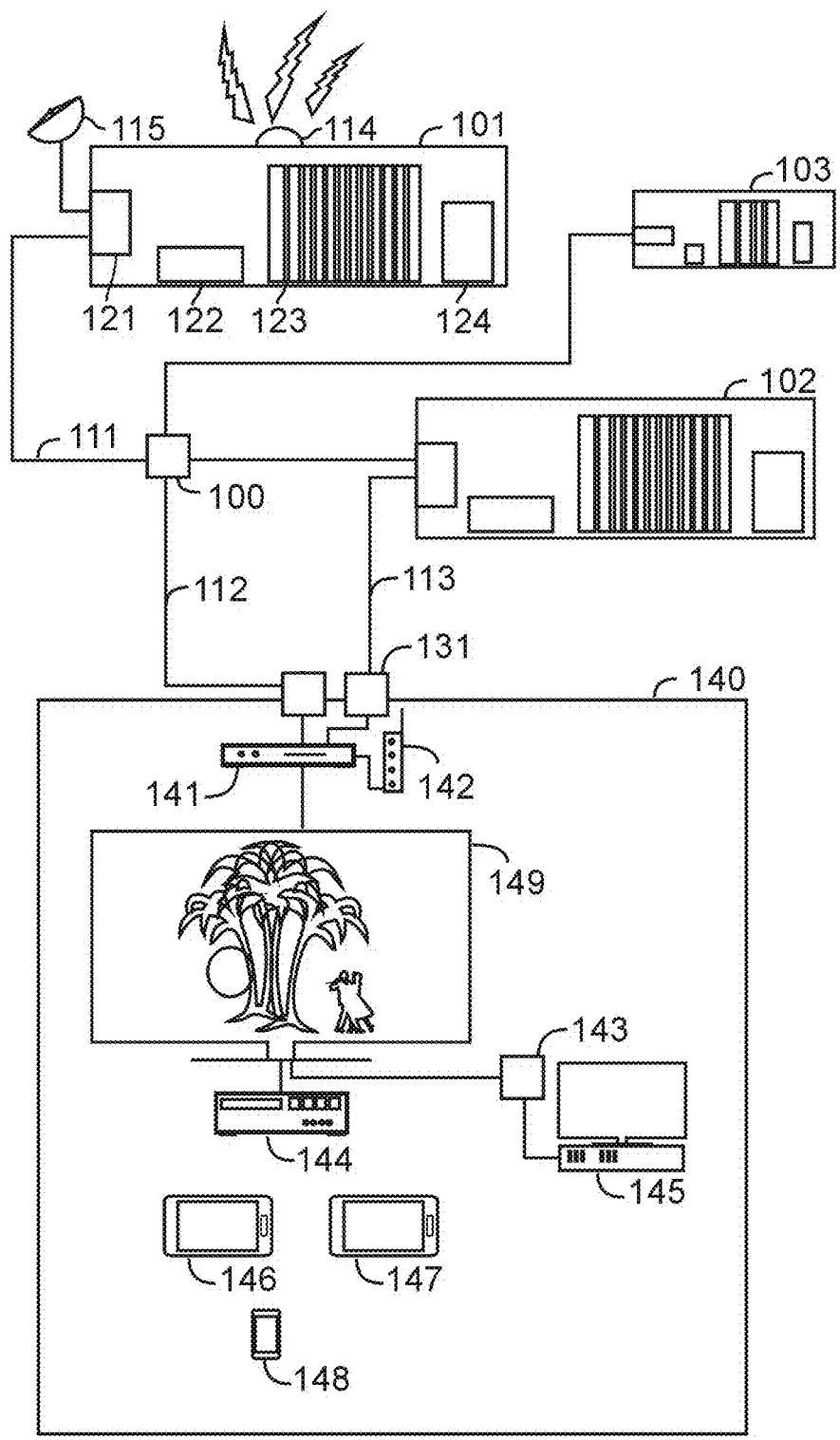
FIG. 1 is a schematic diagram of a video provider and end user communications infrastructure.

For purposes of the present disclosure, various terms used in the art are defined as follows:

The term "herein" shall mean in the entirety of this specification including drawings, abstract, and claims. The term herein is not limited to the paragraph or section in which it may appear.

The terms "include", "comprise", and "contains" do not limit the elements to those listed. By contrast, only the term "consist" limits the elements to those listed.

No conceptual distinction should be drawn from the use of the terms on, at, or in (e.g., no distinction should be drawn from the use of the phrase receiving on, receiving at, or receiving in a second screen device).

The term "responsive" does not limit the elements, conditions, preferences, and/or requirements that may be taken into consideration. For example, an event that is responsive to a specified requirement is not limited to being responsive to only that specified requirement. An event may be responsive to a specified requirement and a second non-specified requirement, specially, when the second requirement, while described as an alternative requirement, may be also deemed complementary.

The terms "application software", "software application", "application", "app", "routine", and "computer software" shall mean all the executable, libraries, scripts, instructions, and/or processor executable steps in any format that causes, or is required by, a device to perform a task, function, or process. Application software or routines comprises a computer program designed to assist a user to perform task, function, process, or activity. In some instances application software and operating system software may be a synergistically integrated and indivisible.

The term "associate" shall mean assign, give, allocate, associate, designate, ascribe, attribute, link, and/or relate.

The term "clip" shall mean a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation.

The term "descriptor" shall mean a keyword, word, term, code, phrase, designations, write-ups, and linkages. The term descriptor shall also mean any data, information, image, and/or video frame that identifies, describes, links, and/or categorizes content of a video, portions of a video, or a video frame. A linkage is any information, data, and/or method that enables retrieving and/or downloading data from a local/internal and/or a remote/external source.

The term "dialog" shall mean a dialog, conversation, monologue, lyric, utterance, and/or communication. Dialog also comprises information that may be included in the subtitles or the closed captioning.

The term "geographic map" shall mean any map, including satellite, topographical, street, and such maps as Google Maps, Google Earth, Google Earth View, Google Street View, OpenStreetMap, and whether 2D or 3D, static or dynamic and interactive, single or multi-featured, and representative or photorealistic. The term "geographic map" shall also mean any depiction (e.g., map) that provides context for a locale.

The term "item" shall mean: (i) an object, article, artifact, instrument, device, and product; (ii) a specific act or action within an activity, process, event, and operation; (iii) an emotion, expression, gesture, and movement; (iv) an effect, consequence, and result; (v) a sound, occasional foreign language, and melodic content; (vi) a portion of a dialog, line, and linguistic expression; (vii) cinematography, cinematographic technique, cinematographic effect, a special effect, technical transition, and production error; (viii) a cameo or special appearance; and (ix) a locale.

The term "keywords" shall mean words, terms, phrases, designations, codes, descriptors, labels, data, metadata, and numbers.

The term "keywording" shall mean associating keywords.

The term "locale" shall mean a locale, location, site, setting, place, area, spot, landmark, location of interest, tourist attraction, building, building exterior, building interior, structure, and a geographically identifiable point. A locale is generally a location or place outside of the movie studio that is used for filming a movie or portion of a movie. A locale may be depicted as the actual locale or may be represented in the depictions as a locale other than the actual locale. The term "locale" is differentiated from the term "location" when the term location refers to a point in the timeline of the video.

The term "navigator" shall mean application software and/or operating system software that provide video playback capabilities, decoding, decrypting, and/or rendering, for playing a movie on a personal computer. A navigator comprises, for example, Microsoft's DVD Navigator, decoder filters, and renderer, to handle, for example, CSS and analog copy protection.

The term "network" shall mean any private or public, wired or wireless communication system.

The term "noteworthy" in connection with content shall mean content that: (i) may be of interest to a significant audience; (ii) is noteworthy, remarkable, or compelling; and/or (iii) is uncommon, atypical, peculiar, unusual, unique, rare, or extraordinary.

The term "performer" shall mean an individual, participant, actor, or actress, appearing in a video and/or credited for the physical and/or the verbal performance of a character. A performer refers to, for example, an actor in a motion picture, an athlete in a televised sporting event, a newscaster in a news program, and a chef in a cooking show.

The terms "play" and "playing", as in play or playing a segment of a video, shall mean playing meaningfully, or substantially all or a portion of a segment. In other words, while a method or system disclosed herein may claim or intend to play the entirety of, or all, of a segment, a complete playing of a segment does not necessarily require the playing of every video frame, interlaced field, audio and sub picture portion, and/or bit of data of the segment.

The term "plot info" shall mean information, rationale, and/or explanation relating to, or relevant to understanding or appreciating, a plot, sub-plot, theme, storyline, principle, idea, key point, clue, and/or item in the movie.

The term "plot point" shall mean a plot, sub-plot, theme, storyline, principle, idea, key point, clue, and item.

The term "preferences" shall mean "programming preference", "version preference", "presentation preference", "content preferences", "function preferences", "technical preferences", and "playback preferences". The term "programming preference" shall mean a preference or preferences for a specific video (e.g. Spider-Man), genres of videos (e.g., Action), types of videos (e.g. interactive video detective games), series of videos (e.g., 007) broad subject matter of videos (e.g. mysteries), and/or time and date for playback of the video. The term "version preference" shall mean a preference or preferences for a version of a video (e.g., motion picture), released by the copyright owner (e.g., motion picture studio), that includes content not available in an alternate version of the video. The version of a video refers to, for example, the "Theatrical", "Unrated", and "Director's Cut" version options in a DVD-Video. The version of a video does not refer to sequels and/or remakes of a video such as Spider-Man (2002), Spider-Man 2 (2204) and The Amazing Spider-Man (2012). The term "presentation preference" shall mean a preference or preferences that cause the selective inclusion, in a presentation, of segments from within a video, from a version of a video, or from within a plurality of videos. The term "presentation preference" shall also mean a preference or preferences for any one of the plurality of features provided by each of the following: Presentations, Compilations, Subjects, Dilemmas, Best Of, Performers, Shopping, Music, Search, and Preview. The term "content preferences" shall mean preferences for the form of expression, explicitness, inclusion or exclusion of objectionable content, a level of explicitness in each of a plurality of content categories of possibly objectionable content, length, level of detail, type of thematic content, and/or depictions of potentially objectionable items and/or acts. The Control feature of the CustomPlay application provides for content preferences. The term "function preference" shall mean a preference or preferences for any one of the plurality of elements provided by, or associated with, an in-video or playback function (e.g., Who, What, Locations, Plot Info, Filmmaking, Trivia, and Info). The term "technical preference" shall mean a preference or preferences for the technical and/or artistic elements (e.g., dissolves, fades, and wipes) that may be implemented during the playing of non-sequential segments. The term "playback preference" shall mean a preference or preferences for visual and audio options (e.g., camera angles, picture with picture, subtitles, closed captioning, and commentaries) that may be available for a video.

The terms "seamless" and "seamlessly" shall mean without gaps perceptible to the human eye, achieved by maintaining a constant video transmission rate. A seamless playing of non-sequential segments (i.e., the skipping of a segment) while technically "seamless", may not appear artistically seamless to a user because a change in the content that is played, rather than how it is played, suggested that a skip of content took place.

The term "search terms" shall mean terms, words, phrases, designations, codes, descriptors, labels, data, metadata, numbers, or other information that identifies, describes, or specifies what is being searched.

The terms "second screen", "secondary screen", and "second screen device" are interchangeable and shall mean any computing device capable of playing/displaying content, e.g., video, audio, images, subtitles, data, and/or information, and used in combination with a primary screen device also capable of playing/displaying content. A primary screen device is also referred to herein as a primary screen. A primary screen and a second screen includes, for example, televisions, personal computers, laptop and portable computers, tablets, smartphones, and mobile devices, remote control devices, and computing devices having a display screen. A primary screen device and a second screen device also comprises audio reproducing and outputting components (e.g., amplifiers and internal and/or external speakers).

The term "seek/step data" shall mean any index, data, and/or information that facilitates access to a video frame within a video and/or facilitates the utilization of a video map with a video. Seek/Step data need not include step data (e.g., data informing a frame advance). Seek/step data may, without the step data, directly address every video frame within a video. Further, for example, and not limitation, seek/step data need not be based on navigation points, synchronizing information (i.e., seek/step data) may be based on shot changes or scene changes in the video.

The terms "segment" and "video segment" shall mean one or more video frames. In the example of a feature presentation (e.g., Sixty minutes) a segment definition generally comprises an identification of a beginning and ending points (e.g., frames) within a video. However, in the examples of second screen function implementations, a segment definition generally identifies a single point (e.g., frame) within a video.

The term "subtitles" shall mean subtitles, and/or any textual information representative of a portion or portions of a video's audio dialogue. A display of subtitles does not require a display of all the subtitles of a video. A display of subtitles may only display a subtitle portion, line, phrase, or unit. Herein, subtitles are materially distinct from closed captioning The term "subtitle information" shall mean information (e.g., data, text, and/or images) that enables displaying subtitles on a screen. Embodiments that are detailed with respect to the display of subtitles and/or use of subtitle information may be alternatively or complementary display and/or use other supplementary information.

The term "supplementary information" shall mean any information, text, data, depiction, images, video, and/or content, that informs, entertains, elucidates, illuminates, illustrates, clarifies, and/or explains.

The term "trailer" shall mean a trailer, preview, video clip, still image, and/or other content that precedes and/or is extraneous to the movie.

The term "user" is interchangeable with the terms "subscriber", "viewer", and "person", and shall mean an end-user person actively using video content, passively viewing a video, interactively playing a video game, retrieving video from a video provider, and/or actively subscribing to and using multimedia, internet, and/or communication services.

The term "variable content video" shall mean a video characterized by a nonlinear architecture facilitating a variety of possible logical sequences of segments. A variable content video comprises parallel, transitional, and/or overlapping segments to provide multiple versions of a video. Responsive to the particular embodiment implemented, a variable content video may also include a user interface, application software, software program routines, system control codes for controlling the playing of the video/audio, video map, bookmark generating data, seek/step data, and/or map synchronization data. A video that does require parallel, transitional, and/or overlapping segments to be variably played.

The terms "video", and "video program" are interchangeable and shall mean any video image regardless of the source, motion, or technology implemented. A video may comprise images and audio found in full motion picture programs, films, movies, interactive electronic games, multi-media content, television programs, commercials, advertisements, and/or entertaining, instructional, and/or educational programming. Responsive to the particular embodiment implemented, subtitles, sub picture information, user interface, application software, software program routines, system control codes for controlling the playing of the video/audio, video map, bookmark instructions, seek/step data, and/or map synchronization data may be provided with a video. The term "movie" shall mean a full length motion picture usually released in theaters and/or optical discs (e.g., a DVD-Video or Blu-ray Disc).

The terms "video map", "map", and "segment map", shall mean any combination, arrangement, table, database, listing, index, and/or information that: defines a beginning and ending of one or more segments; identifies one or a plurality of individual video frames; and/or identifies one or a plurality of play positions in a video or the audio of a video. A video map further comprises data associated with at least: one segment, a sequence of segments, a video frame, and/or a play positions in a video or the audio of a video. A video map's data may comprise, for example,: (i) a descriptor; (ii) an implicit or explicit editing and/or filtering action; (iii) a linkage among segments; (iv) a linkage to an internal/external source of information/content; (v) data, textual, image, audio, and/or video content; and/or (vi) such information, data, linkages, and content that may required to enable or support the features and functions detailed herein. A video map may further comprise bookmark generating data, seek/step data, and video synchronizing information (e.g., an acoustic signature matching database).

The above defined terms and other terms explicitly defined herein are to be understood as defined in this document, and not as they may be defined by incorporation. Incorporation by reference shall not act to modify, limit, or broaden the definitions hereinabove provided or formally defined in this document. A term that is not formally defined in this document is defined herein to have its ordinary and customary meanings.

Networks and End-User Systems

FIG. 1 is a schematic diagram of a video provider and end user communications infrastructure in which participants comprise any number of video 101, data 102, and/or information 103 providers, and end-users systems 140. A provider of video, data, and/or information 101-103 is not limited to any combination of video, data, and/or information services, and the services, while complementary, may be proprietary, exclusive, and independent of the services of other providers. Each participant, whether principally a provider 101-103 or end user 140 is able to retrieve and transmit video, data and/or information from and to any other participant.

The delivery of video and services are herein intended to be deployable by a variety of possible communications networks, infrastructures, computer and server networks, and system configurations. FIG. 1 suggests a plurality of networks, infrastructures, and system configurations that may be implemented. Shown are wired and non-wired communications networks using, for example, one or a hybrid combination of fiber optic 111, coaxial cable 112, twisted copper wire 113, cellular 114, and/or satellite 115.

A video provider, for example 101, comprises: i) communications technologies 111 for establishing a plurality of video and communications streams to a plurality of end-users 140 to enable the uploading and/or downloading of information, data and/or video content; ii) processing hardware and software 122 for retrieving an end user's video preferences, content preferences, second screen function preferences and requests, search terms and search requests, and for processing the user's video preferences, content preferences, second screen function preferences and requests, in-video services, synchronization data, search terms and search requests. e.g., performing searches of segment data to identify the segments or list of segments responsive to a users search terms and search requests; iii) mass storage random access memory devices 123 for storing and retrieving video maps (e.g., segment data), and/or a videobase comprising a plurality of any combination of video segments, motion pictures, conventional programs, interactive games and services, variable content videos, data, in-video function services, synchronization data, and/or information; and iv) processing hardware and software 124 for maintaining accounting and support services in connection with video, data, and/or information services provided.

Video providers may be further categorized according to the functions served and/or the extent and character of the data and videobase maintained. Video services providers 101, e.g., a cable companies, may be capable of providing a greater variety of services than for example information providers 103, e.g., websites. Video and information services available over the internet are suggestive of the wide range of multimedia and information configurations that are possible.

A user's access to the resources of a video services provider 101-103 need not be direct. A requested video may be streamed or downloaded, in real time or non-real-time, to a services provider that may be more economically accessible to the intended user. Within the network 100, some video services provider may not directly provide any services to users, but act as centralized video originators or depositories for other services providers.

In one of many possible embodiments, an end-user video system 140 acquires access to the network 100 and the various services providers 101-103 via a communications device 131, e.g., cable distribution box, satellite dish. An end-users video system 140 comprises a great variety of communications devices, computing devices, and screens 141-149. Principally communications devices include, for example, a modem 141, e.g., cable modem; an internal communications device 142, e.g., wired and wireless router; and a network/wireless extender 143. The end-user's communication interfaces such as Wi-Fi, Ethernet, cellular, 4G LTE, HDMI, Optical, G.hn, and USB facilitate communications among the end-users various computing devices and multi-screen combinations 144-149, which include, for example, set top box 144, e.g., cable box; PC/monitor 145; tablets 146-147; smartphone 148; and television 149. A device may be generally categorized as principally a communications device, a computing device, or a screen. However, devices, such as tablets 146-147, smartphones 148, and portable/notebook computers 145, comprise all three functions. Further, a television screen 149 may include computing, storage, and communications capabilities that may otherwise be separately provided in a set-top box or television media accessory 144.

Communications between devices may be established by any of a variety of wired or wireless communications networks including, for example, Wi-Fi and cellular (e.g., 4G LTE) communications networks. Thus, a computing device need not be directly or indirectly connected by wire to a screen 149. For example, a computing device 145 may be connected to a second screen 149 via a communications port 143. The communications port may be of varying degrees of intelligence and capabilities, it may serve to boost or manage the signal, or have no other purpose than to serve as a convenient outlet in which to plug and unplug devices.

The particular location of an end-users devices, screens, subsystems, or components, whether within the immediate boundaries of a residence or the particular location, are not limited herein to any particular arrangement. A variety of configurations are possible to meet the various needs at any particular time of the end user. In a preferred embodiment an end-user configuration comprises a primary display device 149, one or multiple secondary display devices such as a personal computer or portable computer 145, tablets 146-147, and/or smartphone 148.

An application software appropriate for the communications infrastructure may reside directly or indirectly in the primary display device, secondary display device, and/or separate device in communication with the primary display device and secondary display device.

Multi-screen combinations include, for example, television 149 and smartphone 148, pc/laptop 145 and smartphone 148, television 149 and pc/laptop 145, and television 149 and multiple tablets 146-147. Multi-screen combinations need not be limited to a primary screen and a secondary screen. For example, a second screen such as a tablet 146 may provide a second screen experience with respect to a primary screen such a television 149, and with respect to another second screen such as a second tablet 147.

Multi-screen usage modes may be broadly categorized as disruptive (e.g., multi-tasking unrelated content) or complementary; sequential (e.g., usage of a primary screen is followed by usage of a second screen) or simultaneous; planned (e.g., expected usage of a second screen as part of the viewing of the content on a primary screen) or spontaneous; and/or dependent (e.g., highly integrated with content on the primary screen) or independent. However, a multi-screen usage may be, for example, both disruptive and complementary. Disruptive, for example, in the sense that the linear video experience is interrupted. while at the same time complementary in the sense that information is provided that the user would deem advantageous in enhancing the video experience. In a preferred embodiment a second screen's user interface provides interactive capabilities that are highly tailored and synergistically integrated with a specific content displayed in a primary screen.

Implementation of the novel features detailed herein are not confined to the communications infrastructure, services providers, and end-user multi-screen systems detailed with respect to FIG. 1. A great many alternate or complementary devices, systems, components, elements, and services may be integrated in a multi-screen configuration as is, for example, disclosed by: U.S. Pat. No. 8,516,533, titled "Second Screen Methods And Arrangements"; U.S. patent publication 20120151509, titled "System, Method And Device For Providing A Mobile Application Across Smartphone Platforms To Enable Consumer Connectivity And Control Of Media"; U.S. patent publication 20120210349, titled "Multiple-Screen Interactive Screen Architecture"; U.S. patent publication 20130061267, titled "Method And System For Using A Second Screen Device For Interacting With A Set Top Box To Enhance A User Experience"; U.S. patent publication 20130111514, titled "Second Screen Interactive Platform". Each of these cited references provide disclosures with respect to their respective FIG. 1 that are directly related to the disclosure above with respect to FIG. 1 and which are incorporated herein by reference.

Video Map

The Video Map ¶¶0175-0196 disclosures in U.S. patent publication 20130343721, titled "Playing A Video Presentation With Playback Functions" (the "'721 publication") are incorporated herein by reference. Further, the '721 publication's disclosures with respect to Presentation Features ¶¶0075-0092, and Playback Functions ¶¶0093-0096 are also incorporated herein by reference. With respect to a creation of a video map, the disclosures in ¶¶0117-0123 of U.S. patent publication 20130251337, titled "Providing Item Information During Video Playing" are incorporated herein by reference. Further, the Video Map ¶¶0063-0076, Bookmark Generating Data ¶¶0105-0114, Seek/Step Data ¶¶0115-0148, and Map Synchronization ¶¶0149-0188 disclosures of U.S. patent publication 20140219630 titled "Video Map Responsive To A Video Release" are incorporated herein by reference. U.S. Pat. No. 6,889,383, titled "Delivery of navigation data for playback of audio and video content", U.S. Pat. No. 7,975,021 titled "Method and user interface for downloading audio and video content filters to a media player", and U.S. Pat. No. 8,117,282 titled "Media player configured to receive playback filters from alternative storage mediums", are incorporated herein by reference in their entirety.

An embodiment of such a disclosed video map and playback capabilities is implemented in a currently freely available CustomPlay PC application which provides users a comprehensive set of video playback features and in-video functions for movies released on DVD. The CustomPlay's fourteen feature sets include Presentations, Compilations, Subjects, Dilemmas, Best Of, Performers, Filmmaking, Plot Info, Shopping, Music, Locations, Search, Preview, and Control. The CustomPlay's eight in-video and playback functions include Plot Info, Locations, Filmmaking, Shopping, Music, Who, What, and Play From. In the movie Casino Royale, examples of the video map enabled CustomPlay capabilities include 91 Shopping items, 19 Locations with links to Apple Maps, 12 entertaining Subjects (1-2 minutes each), 5 story-driven Presentations (26-115 minutes each), over 51,000 keywords that drive the extensive Search feature, and 14 content-customization categories.

A video, video map, information and content related to the video, play routines specific to the video, and control codes for automatically configuring or controlling the functions of the end-user devices and video playback system may be provided by means of a variety of existing and evolving technologies. In addition to the hard formats such as optical disc, memory chips and modules; a video may be provided by soft formats, such as streaming or downloading over a network implementing any variety of video and data transmission technologies. A device need not be physically accessible by a user or be physically located near a display device or screen. The device may provide a user access to remote video resources and may itself be remotely controlled by the user. It is within a network-based implementation, that the various advantages and capabilities of the preferred embodiments are realized. The 721 publication's Video Provider ¶¶0250-0256 disclosures are incorporated herein by reference.

A video map may be provided with, or separate from, the video's video and audio data. For example, a movie may be retrieved, e.g., downloaded or streamed, from a remote video provider, and a corresponding video map may be retrieved from a secondary remote source, e.g., downloaded by means of the communications interface from a remote server. For example, a multi-screen configuration comprising processing, a memory device, and communications capabilities may provide playback features and in-video functions for a movie streamed from a remote video provider. In this embodiment, a video map, user interface and other control programs particular to the motion picture may be downloaded from a remote map server or other player. Upon a playing of a video, the control program causes the reading of the video's identifier from the video source, searches the mass memory fixed storage device for a video map and if not available communicates with an external source to download the appropriate map. In this fashion conventional linear video programs provide a library of motion pictures to which the teachings herein may be applied.

A video map and/or a video maps' components (e.g., acoustic signature data) may be downloaded prior to playing the corresponding video, contemporaneously as the video is playing, and following the playing of the video. Some components may be downloaded prior to, while others may be downloaded as needed, and some may be downloaded at the conclusion of the playing of the video. Further, the downloading of information and content may be responsive to a user's preestablished or contemporaneously established features and functions preferences, the particular multi-screen environment and second screen embodiment.

Devices

The '721 publication discloses a Multimedia Player that, in one of many possible embodiments, may be central to the processing and communications in a multi-screen configuration. The '721 publication's Multimedia Player ¶¶0197-0223 disclosure is incorporated herein by reference. Still further, the teachings of currently available end-user devices, such as plug and play boxes (e.g., Apple TV $2^{nd}$ generation, Roku Generation 3, Amazon Fire TV), HDMI sticks (e.g., Roku Streaming HDMI stick, Google Chromecast HDMI stick)

Specifically, with respect to second screen devices, the teachings of second screen capable device such as, for example, smartphones (e.g., iPhone, Samsung Galaxy, and Nokia Lumia), tablets (e.g., iPad Air, Amazon Kindle Fire, Microsoft Surface, Samsung Galaxy Tabs, Sony Xperia), and smart TVs (e.g., Samsung UHD Series, Sony KDL Smart TV Series) are incorporated herein by reference.

To the extent necessary, these devices may be enhanced with the addition of processing, firmware, memory, communications, and/or software routines and applications to accommodate the second screen capabilities disclosed herein. A processor is herein presumed to comprise a hardware processor (e.g., central processing unit, CPU, and associated computing or calculating devices (e.g., graphic chips) and application software. Further, a second screen device may provide, responsive to the multi-screen configuration and user's preferences, tactile feedback (e.g., device vibration, mechanical movement of a device's key), auditory, and/or visual notification that alerts the interested viewer to the forthcoming depiction of content and functions. Tactile feedback may include, for example, device vibration and/or mechanical movement of a device's key or button. A notification associated with a function or specific function may be executed by the number of vibrations or particular rings tones.

Remote Control Functions

A user's control of a device may be direct, e.g., key controls or screen buttons directly on the device, or indirect, e.g., remote controls. A user's control of a device may implement any number of technologies including, for example, conventional remote controls, alphanumeric keyboard and touchpad, voice control, gesture recognition, and/or a secondary device such as a tablet or phone. Communications for a remote control include, for example, infrared, Wi-Fi, and Bluetooth. The '721 publication's disclosures with respect to Playback Function Controls ¶¶0146-0150 is incorporated herein by reference. With respect to generating a dynamic user interface on a second screen control device, U.S. patent publication 20130007793 titled "Primary Screen View Control Through Kinetic UI Framework" is incorporated herein by reference.

A significant function of a second screen is to provide video playback controls in addition to facilitating the display of content that complements the viewing of content on primary screen. Advantageously, a smartphone and a tablet application, for example, provides all the functionality of the remote control and on-screen interfaces. Such devices may communicate with the player via Wi-Fi capability via a transmitting application in the controller and a listener application in the controlled device.

Figure 2:
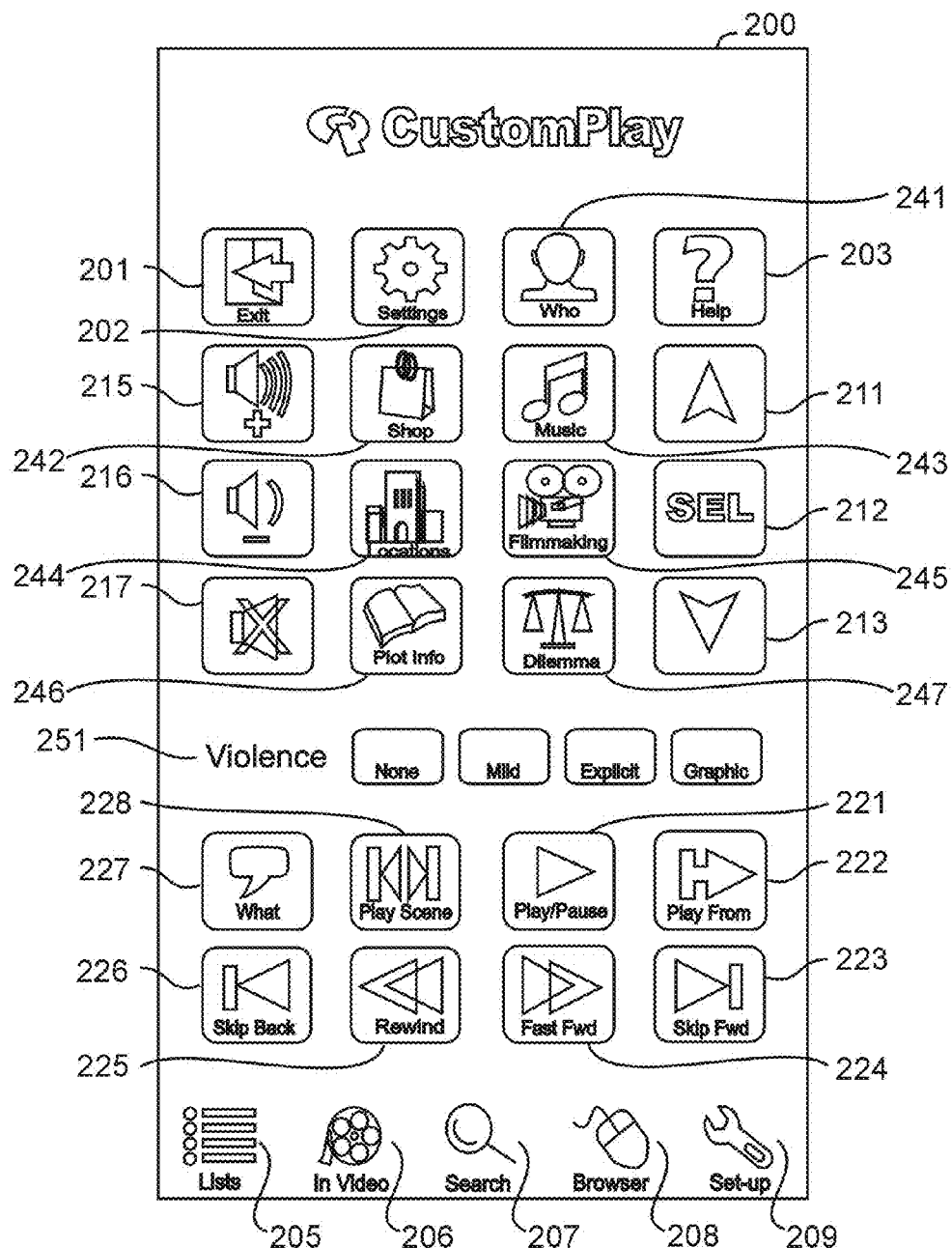
FIG. 2 is an illustration of a smartphone remote control interface.

FIG. 2 is an illustration of a smartphone remote control interface 200. Touching, a control, for example, activates the function routines associated with the button/object. The interface 200 comprises, for example, interface navigation controls 201-209 (e.g., Exit 201, Settings 202, Help 203, Lists 205, In-Video 206, Search 207, Browser 208, and Set-up 209); selection functions 211-213 (e.g., Up 211, Select 212, Down 212); audio volume controls 215-217 (e.g., increase volume 215, decrease volume 216, mute 217); playback function controls 221-228 (e.g., Play/Pause Toggle 221, Play From 222, Skip Forward Clip/Scene 223, Fast Forward 224, Fast Rewind 225, Skip Back Clip/Scene 226, What 227, and Play Current Clip/Scene 228); in-video function controls 241-247 (e.g., Who 241, Shopping 242, Music 243, Locations 244, Filmmaking 245, Plot Info 246, and Dilemma 247); and content controls 251 (e.g., content category Violence and levels of explicitness None, Mild, Explicit, and Graphic).

The Exit control 201 provides confirmation to exit the application, The Settings function 202 displays a screen that provides customization for the display of in-video notifications on the primary screen and/or a second screen. The Help function 203 provides context sensitive help information. The List function 205 displays, in the primary screen or the secondary screen, a menu of CustomPlay features. The In-Video function 206 displays a screen that provides the various in-video functions and play control functions shown in FIG. 2. The Search function 207 displays a screen that provides Search functionality. The Browser function 208 displays a screen that provides mouse and keyboard functionality. The Set-up function 209 displays a screen that provides access to the various utilities for establishing communications with other devices (e.g., IP address and port number).

The Play From control 222 enables a user to continue playback from a current position in the video irrespective of the particular feature that is currently being used. For example, a user may utilize the Search feature to obtain a list of segments that are responsive to a keyword search. While playing one of the segments in the list, the user may activate the Play From control to play the video from that point in the segment. Advantageously, the Play From control is further responsive to a user preestablished presentation preference (e.g., Play As Is or Custom presentations). Without a preestablished presentation preference the Play From control may be set to default to the Custom presentation rather than, for example, the Play As Is presentation. Alternatively, the Play From control defaults to playing the last presentation played by that user for that movie, or, a presentation may be selected responsive to the last feature utilized. For example, and responsive to a user preference, if the Search or Preview feature is last utilized, the Play From control enables the Play As Is presentation. If on the other hand, the Best Of feature is last utilized, the Play From control enables the Custom presentation.

The What replay control 227, when enabled by the user during playback, rewinds the video a user defined amount of time, and replays a portion of the video with the subtitles enabled. With respect to replay capabilities, the disclosures of U.S. Pat. No. 6,408,128 titled "Replaying with supplementary information a segment of a video"; and U.S. Pat. No. 7,430,360 titled "Replaying A Video Segment With Changed Audio"; are incorporated herein by reference.

The Play Current Clip/Scene control 228 utilizes the clip and scene database portions of a video map to identify a clip or scene definition that is responsive to the current play position and automatically rewind to the beginning of the clip or scene and plays from that position. Whether a Clip/Scene control (Skip Forward Clip/Scene 223, Skip Back Clip/Scene 226, Play Current Clip/Scene 228) is responsive to a Clip or Scene is user a predefined option.

Second Screen Functions

Generally, a second screen function is a type of in-video function that is enabled on a second screen or a multi-screen system during video playback on a primary screen. With respect to second screen apparatus, systems, architectures, methods, and functionalities, the following disclosures are incorporated herein by reference: U.S. Pat. No. 8,516,533 titled "Second Screen Methods And Arrangements"; U.S. Pat. No. 8,424,037 titled "Apparatus, Systems And Methods For Accessing And Synchronizing Presentation Of Media Content And Supplemental Media Rich Content In Response To Selection Of A Presented Object"; U.S. Pat. No. 7,899,915 titled "Method And Apparatus For Browsing Using Multiple Coordinated Device Sets"; U.S. patent application 20120210349 titled "Multiple-Screen Interactive Screen Architecture"; U.S. patent application 20130061267 titled "Method And System For Using A Second Screen Device For Interacting With A Set Top Box To Enhance A User Experience"; U.S. patent application 20130014155 titled "System And Method For Presenting Content With Time Based Metadata"; and U.S. patent application 20140165112 titled "Launching A Second-Screen Application Related To A Non-Triggered First-Screen Application".

The teachings of currently available second screen capabilities and functions, such as Google's Play Info Cards, Amazon's X-Ray, Xbox's SmartGlass, iTunes Extras, X-Men Movies Cerebro App, IMDb App For iPhone, iPad & iPod Touch, and RunPee, are incorporated herein by reference. A number of methodologies are available to synchronize many different devices through Wi-Fi networks and/or remote servers (e.g., JargonTalk).

A video map that enables the CustomPlay's fourteen feature sets and eight in-video and playback functions provides the information necessary to enable the variety of synergistically integrated multi-screen capabilities. The '721 publication's disclosures with respect to the Presentation Features ¶¶0075-0092, Playback Functions ¶¶0093-0096, Where Function ¶¶0097-0122, Why Function ¶¶0123-0129, How Function ¶¶0130-0139, and Info Function ¶¶0140-0145 are incorporated herein by reference and implemented as complementary or alternative second screen embodiments. The Where Function, Why Function, and How Function are referred to herein, respectively, as the Locations Function, Plot Info Function, and Filmmaking Function.

It is intended by this specification that the features, playback features, playback functions, in-video functions, and functions disclosed herein and incorporated by reference may be implemented in various second screen embodiments that do not require altering a conventional playing of a video on a primary screen (e.g., remote control functions on the second screen, superimposing notification indications, seamless skipping of video segments, and selective playing of segments).

Second screen functions may take advantage of any additional video content (e.g., video/audio commentary, or supplementary video/audio content) that is supplied with or is available for the movie. In the case of additional video content that is supplied with the movie, the video map would, advantageously, map the video/audio segments from within the additional video content, and associate descriptors including synchronization data (e.g., references or linkages). A second screen function would to utilize the synchronization data to provide additional information (e.g. additional video content) during playback of the movie.

What Second Screen Function

Figure 3A:
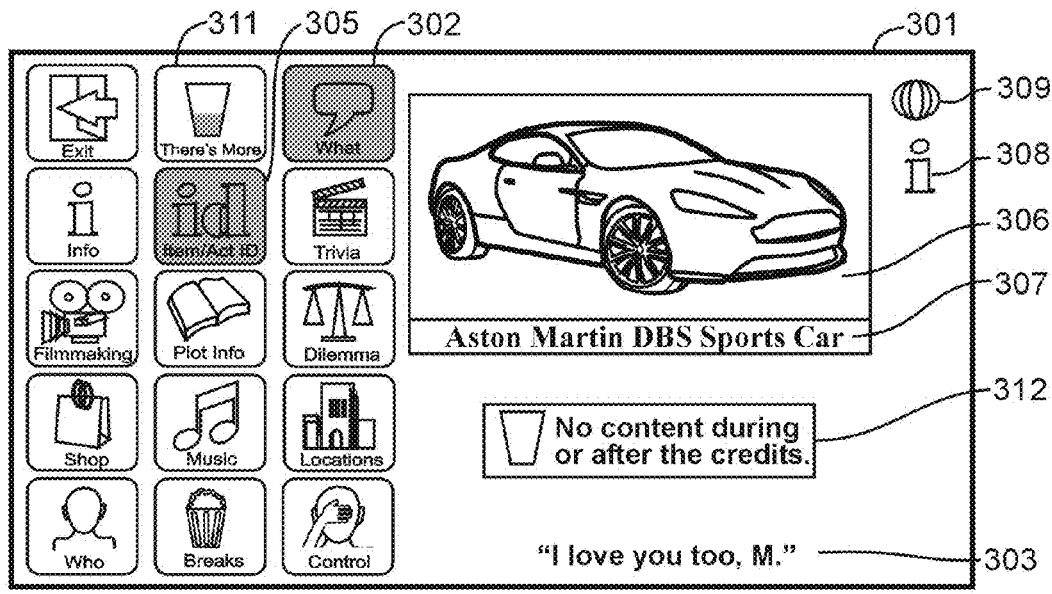
FIG. 3A is an illustration of a second screen display of features of a What, ID, and Credits functions.

FIG. 3A is an illustration of a second screen display of features of a What function. The illustration of a user interface 301 represents a clip in the motion picture Casino Royal in which 007 approaches an Aston Martin automobile. The clip is followed by a clip depicting 007 seated in the car and delivering a line in response to opening an envelope. In this example, the user desiring to understand what he said activates the What function control 302 which causes the display of the subtitles 303 of the recently delivered line: "I love you too, M". The What function control 302, optionally and/or responsive to the particular second screen embodiment, may not rewind the video. Instead, when enabled by the user, and responsive to the user preference, the activation of the What function 302 displays the subtitles 303 only on the second screen 301 for a portion of the video recently played. The video itself is not replayed. Unlike the disclosure of the previously incorporated U.S. Pat. No. 6,408,128, this function enables one user to display the subtitles 303 for a not understood dialogue portion without interfering with the viewing experience of a second user. Since multitasking of features and accessing additional external information is an advantage of the second screen application, the chances are increased that a user may miss dialogue the user would not otherwise have missed.

An activation of the What function (e.g., touching the What function icon 302 on the second screen interface 301) causes the second screen's processing to identify the current play position either directly or indirectly from a playing of the video on a primary screen and/or from the second screen's internal play clock synchronized to the video playback. This request position is utilized to define a period of time within the video for which subtitles will be displayed. A system default and/or a viewer's preestablished preferences determines: the period that subtitles are displayed (e.g., "replayed" 20 seconds); the subtitle language (e.g., English or another user preferred language) depending on the availability of sub-title information; the type of the subtitles (e.g., subtitles, closed captioning, descriptive content, and commentary); and the time to discontinue displaying subtitles (e.g., at either the point the What function was activated or at some system specified and/or a viewer preestablished preferences with respect to the time at which the What function was activated (e.g., five seconds prior to, or after, the point the What function was activated). The video map subtitle data is searched to identify the subtitle information corresponding to the desired period of time. The appropriate subtitles are then displayed, responsive to the particular second screen embodiment, on the primary screen and/or the second screen, without requiring a rewinding and replay of the video.

By contrast to the methodology implemented when the video is replayed with subtitles, in the case of a second screen embodiment there are a number of novel methodologies that may be implemented depending on, for example,: the nature of the primary screen/video playback device and second screen communication; whether a separate device/software is playing the video and whether it is capable of multitasking an uninterrupted playing of the video while retrieving the necessary subtitle information; and/or whether the subtitle information may be retrieved by the second screen independently of the video playback capabilities and inclusion of subtitles with the video. In a preferred stand alone second screen embodiment, the subtitle information is downloaded from a local or remote memory device/server. In one embodiment, as part of a downloading of a video map, the subtitle information is downloaded together with subtitle synchronizing information. The synchronizing information enables the second screen to synchronize the display of subtitles to the video playback on the primary screen. In this example, the subtitle information and synchronizing data are provided by a third party or parties. Since the video is not being replayed, such a display of subtitles need not be exactly synchronized with the audio track, a delay or offset may be advantageously implemented prior to delivering the data to the second screen. Thus, the synchronizing information may already offset the display of subtitles.

Alternatively, to an intermittent activation of the What function, a particularly inventive continuous display of subtitles implements a counterintuitive advantageous offset synchronization methodology. This implementation is innovatively distinct from the display of closed captioning on a primary screen principally because a haphazard delay in the display of closed captioning is not advantageous and is only available on the primary screen.

A display of subtitles may be responsive to a user preestablished preference with respect to all videos, a specific category of videos (e.g., Foreign Films), specific sequences within a video (e.g., scenes with Heavily Accented dialogue, or Non U.S. Accented English dialogue), and specific portions comprising dialogue that is deemed unclear. If the activation of the What function has not been preestablished, then a user may activate, at any time, the What function in continuous mode by pressing and holding the What function control 302. This will enable the What function in continuous mode rather than the temporary mode that is enabled by only touching the What function control 302. The continuous mode may be deactivated by a subsequent touching of the What function control 302.

Figure 3B:
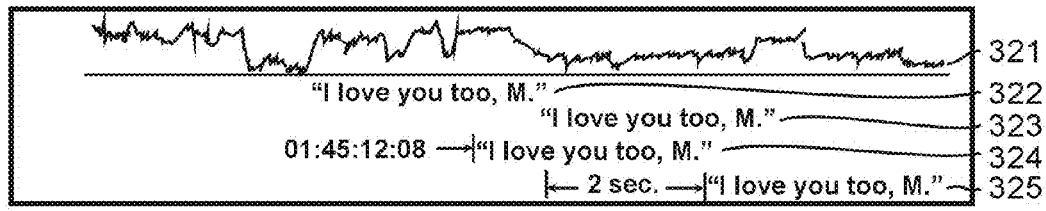
FIG. 3B is an illustration of offset synchronization methodologies.

If the What function has been activated in continuous mode then the subtitles or preselected portions of the subtitles are displayed continuously in a synchronized offset fashion. In this context, the concepts of the terms offset, delay, and related synonyms, are similarly applicable and interchangeable. FIG. 3B is an illustration of offset synchronization methodologies. Conventionally, subtitles are displayed as close as possible to the actual dialogue in the audio track. FIG. 3B illustrates a subtitle unit "I love you too, M," 322 synchronized in conventional manner with an audio track including a dialogue portion 321. FIG. 3B also illustrates an offset synchronization of the display of subtitles that may be controlled by one or a combinations of offset methodologies, including, for example,: the subtitle portion/sentence/phrase (subtitle unit) is displayed the equivalent of a subtitle unit(s) 323 after the corresponding accurately synchronized subtitle would have been displayed 322; the subtitle is displayed at a preestablished play position 324 after the position at which the corresponding accurately synchronized subtitle would have been began to be displayed 322; and the subtitle is displayed a system default and/or a viewer's preestablished time offset period 325 (e.g., a delay of 2 seconds) after the time at which the corresponding accurately synchronized subtitle would have been displayed or began to be displayed. Contrary to the haphazard unsynchronized delay between a real-time created closed captioning and the corresponding dialogue, in a What embodiment, a subtitle offset synchronization is controlled.

A continuous mode does not necessarily mean that all of the subtitle units are played. Continuous mode may only play, for example, a subset of the subtitles (e.g., 10-12 subtitle segments corresponding to those select instances in the video that the audio was least clear and/or the best lines in the video). An intermitting continuous mode will materially reduce the amount of subtitles that are displayed and thus reduce the subtitle data needed to be provided to the second screen.

Exemplary embodiments comprise: downloading, over a communications network from a remote information provider, supplementary information (e.g., subtitles) to a memory of a second screen device; receiving synchronizing information that is responsive to a playing of a video on a primary screen device (e.g., the second screen device receiving, over a Wi-Fi network, from the primary screen device an identification of a current play position of a video being played on the primary screen device; or using a built-in microphone to receive audio information, principally from a video playing on a primary screen device, to generate an acoustic fingerprint; or downloading synchronizing information from a remote information provider); establishing, responsive to the synchronizing information, a synchronization to the playing of the video on the primary screen device (e.g., utilizing the identification of a current play position or comparing the acoustic fingerprint to an acoustic database to determine the current play position of the video playing on the primary screen device); and displaying the supplementary information on the second screen device responsive to an offset synchronization to the video playing on the primary screen device, whereby the display of supplementary information on the second screen device lags a contemporaneous playing of the video on the primary screen device.

Individual steps outlined above may be performed by the primary screen device, the second screen device, a remote service provider, alone or in logical combination. For example, an identification of a current play position may be performed by the primary screen device, the second screen device by means of generating and comparing an acoustic fingerprint, or by a remote service provider by means of analyzing audio information received from the second screen device over a computer communications network. When remote processing is involved, the offset synchronization may be performed by the remote processing, and the downloaded supplementary information may be adjusted accordingly. Offset synchronization methodologies may be advantageously applied to other functions, display of information and display of supplementary information embodiments disclosed herein. Different synchronization methodologies may be simultaneously active within a single display, each responsive to, for example, the relationship of the supplementary information to the depiction presently played on a primary screen. Further, advantageously, a user is provided the option to deactivate, activate, select the particular offset synchronization methodology, and/or adjust the offset delay parameters (e.g., time delay and subtitle units delays). Deactivating the offset in synchronization restores a conventional synchronization.

Notwithstanding the conceptual distinctions, the previously incorporated U.S. Pat. No. 6,408,128 discloses at 46:57-53:19 a number of routines, elements, and features that may be synergistically integrated with the inventive implementations and embodiments disclosed herein. For example, similar to the disclosed rewinding of the video being cumulative responsive to multiple successive activation of the What function, in a second screen embodiment, the period of time that defines the display of subtitles is also cumulative responsive to multiple successive activation of the What function.

ID and Credits Second Screen Functions.

The user interface 301 of FIG. 3A also comprises an ID function control 305 and a Credits function control 311. A user desiring to obtain identification information activates the ID function control 305 which causes the display of the identification of the noteworthy item/action. The identification of an item comprises, for example, an image from the video and/or a promotional image 306, written identification 307 (e.g., brand name, model, description "Aston Martin DBS Sports Car", type of action and name of the action "martial arts butterfly kick"), a write-up, and access to additional information 308, and/or linkages to external sources providing further information about the item/action (e.g., Wikipedia page) 309.

Further, the ID function may synergistically take advantage of the data associated with a Subject presentation. For example, the Subject "The Dude" in the movie The Big Lebowski, the subject identifies over 100 instances of the dialogue including the term "Dude". During an ID Game function, a notification is displayed for each instance in the particular ID Game set to enable the participants to take the particular action that they have associated with the game (e.g., deliver a best line from the movie). An ID Game notification may also include the presentation of Trivia function information/question, and/or the presentation of a simplified Yes/No question, to determine if the particular action that has been associated with the game or the particular notification instance is to be performed.

A primary objective of the Credits function is to inform the user that there is additional content during and/or after the playing of the credits. A user may query the function at any time by pressing the Credits function control 311 which enables routines that cause the display of an appropriate message. In this example, the user is informed that there is no content during or after the credits 312.

By contrast, in the motion picture The Avengers after one minute and fifty six seconds of the films credits, a short scene depicts the evil super villain Thanos talking to his emissary The Other is played. The credits resume for six minutes and seventeen seconds, and a final scene depicting the Avenges eating at a Middle Eastern restaurant concludes the credit sequence. In this example, activating the Credits function control 311 causes a display informing the user that: "There are two separate sequences during the credits."

The Credits function may also, responsive to system default or user preference, be automatically activated immediately as the credits begin to be displayed on the primary screen. Such an automatic activation would inform the user on the primary and/or secondary screen of whether or not there is additional content that follows. Additionally, responsive to a user's preference or the activation of the Credits function control, the playing of the movies is automatically terminated if there is no content during or after the credits. If there is content during or after the credits, responsive to the video map, the non-content portions of the credits are seamlessly skipped. In other words, with respect to the motion picture The Avengers, the first minute and fifty six seconds of the films credits are skipped, a short scene depicting the evil super villain Thanos talking to his emissary The Other is played, the following six minutes and seventeen seconds of credits are skipped, and the final scene depicting the Avengers is played.

As in other examples, the illustration of the icon and label for a function control may be responsive to the object of the function. For example, in the case of the Credits function control 311, if there is content during or after the credits, the icon of a glass is depicted as not being empty, and the label reads, for example,: "There's More".

By contrast to the Credits function that enables a user to see all of the content of a video, a Synopsys function enables a user to discontinue viewing a video at any point and still find out how the plot of the video resolved itself. The Synopsys function map fragments/defines the video into chapters, scenes, clips, and/or period of time to generate multiple units of the video. Each unit is associated with a time code corresponding to a video's play position at which the unit begins. A short write-up synopsis (e.g., a paragraph) is created for every unit in the video.

When a user activates a Synopsis function control, an identification is obtained of a stop play position in the video playing on the primary screen device. Responsive to the identified stop play position, the synopsis for units with a time code that follows the stop play position are provided the user as a brief summary of the not viewed portion of the video. The write-up for a unit that immediately precedes stop play position may also be included in the summary. The synopsis summary may be displayed as a series of paragraphs preceded by the beginning time code. Advantageously, the synopsis summary enables the user to easily obtain information relating to the conclusion of a video which for one reason or the other they may not desire, or be able, to finish viewing (e.g. airplane landing).

An activation of the Synopsys function control may also provide the user a number of options. First, a user may be asked to confirm the display of the synopsis summary by requiring a reply to a confirmation message (e.g., "Would you like to know what happens in the film from this point forward?") Second, and advantageously, in those Features capable implementations, the user is provided to transfer to a 60 Minutes presentation beginning at a point in the presentation that is responsive to the stop play position. Further, instead of a written write-up summarizing individual units, a specifically prepared video synopsis may instead be provided. In such a case, the video synopsis summary may be a generalized single piece that is independent of a stop play position, rather than fragmented units which are combined in real-time responsive to the stop play position and which would play as a single video synopsis summary.

Who Second Screen Function

The Who function identifies the performers and characters being depicted and provides access to resources, e.g., websites, for additional information. With respect to the Who function, the disclosure of U.S. Pat. No. 8,494,346 titled "Identifying A Performer During A Playing Of A Video" is incorporated herein by reference.

Figure 3C:
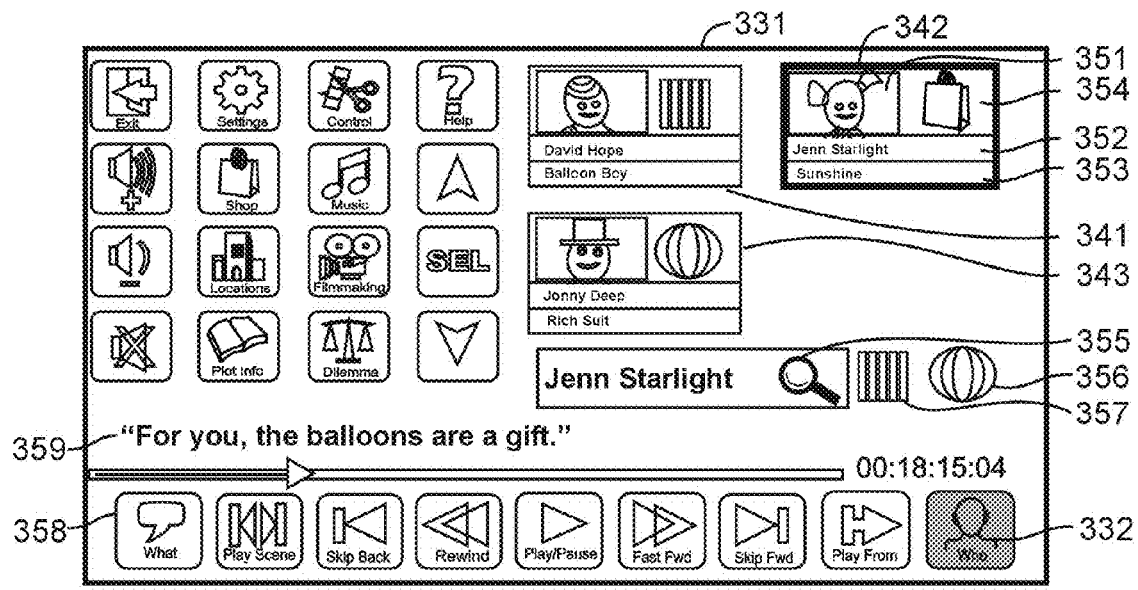
FIG. 3C is an illustration of a second screen display of features of a Who function.

FIG. 3C is an illustration of a second screen display of features of a Who function. Responsive to preestablished user preference and the current play position, Who information is displayed on the second screen 331 contemporaneously with the playing of the video on the primary screen. The contemporaneous display may be in strict synchronization (e.g., only when the character is depicted on the screen), implement an offset synchronization, and/or implement a segment responsive synchronization (e.g. for the entirety of a clip in which a character is depicted for at least some portion). In this exemplary illustration, a user had elected to activate the Who function control 332 to execute contemporaneously as the video is being played. Thus, responsive to the current play position, the depicted noteworthy performers/characters are identified (e.g., David Hope 341, Jenn Starlight 342, and Jonny Deep 343).

The Who data comprises, for example, a visual depiction of the performer of a character and the performer's name. With respect to movie and performer information and features available in a second screen application, the teachings of the IMDb App for iPhone, iPad & iPod Touch Version 4.4 is incorporated herein by reference. Additionally, the Who data comprises a character's name and an image of the character. In this illustration, the image of a character is extracted from within the video and displayed 351, together with the performer's name ("Jenn Starlight") 352, and the character's name ("Sunshine") 353.

Each character is also associated with noteworthy features and/or in-video functions extracted from and related to the movie. For example, David Hope 341 is associated with a Subject featuring the character's particular mannerisms; and Jenn Starlight 342 is associated with Shopping items that she wears in the movie. Pressing the suggested function control 354 launches the appropriate function either on the primary screen and/or the secondary screen. In the case of the Jenn Starlight 342 illustration, the Shopping function control 354 launches a website where shopping information about the displayed stripe dress is provided.

The interface, taking advantage of the Search feature of a second screen application, also provides a user the capability to automatically search 355 within the video for instances of the same currently highlighted performer 342. For example, a user may access the best lines of a character, close-up presentation, and product placements featuring the character. Similarly, a user is provided the means (e.g., Internet icon control 356) to obtain external information relating to the performer (e.g., filmography website page), and the means (e.g., SUB icon control 357) to play a presentation of the plurality of video segments (e.g., a Subject) within the video relating to the currently highlighted character/performer 342. This exemplary embodiment also comprises the previously detailed What function control 358 and the display of subtitles 359.

Locations Second Screen Function

The Locations function identifies the locale being depicted and provides access via linkages to relevant locale information and geographical maps. The '721 publication's disclosures with respect to the Where Function ¶¶0097-0122 are incorporated herein by reference.

Data created for, or utilized by the Locations function comprises, for example,: a segment definition; an identity, as represented in the video, of a locale depicted within a video segment defined by the selected segment definition; an actual identity of the locale depicted within the video segment; a linkage, responsive to the actual identity, to a geographic map; a video frame identifier to provide a reference image and thumbnail; a write-up to provide brief in-video information; and a linkage to more detailed information. For example, in the motion picture The Dark Knight, the video map defines a segment by frames numbers 8797-8990 (23.976 frames per second) for a segment including the depiction of the exterior of the building represented in the movie to be the Gotham National Bank. The video map provides a locale identity as represented in the video (e.g., Gotham National Bank), and an actual identity of the locale (e.g., Old Chicago Main Post Office). The video map for the motion picture The Dark Knight also includes an identification of video frame number, i.e., 8989, that is associated with the segment definition to provide a reference image and thumbnail for the locale.

Figure 4A:
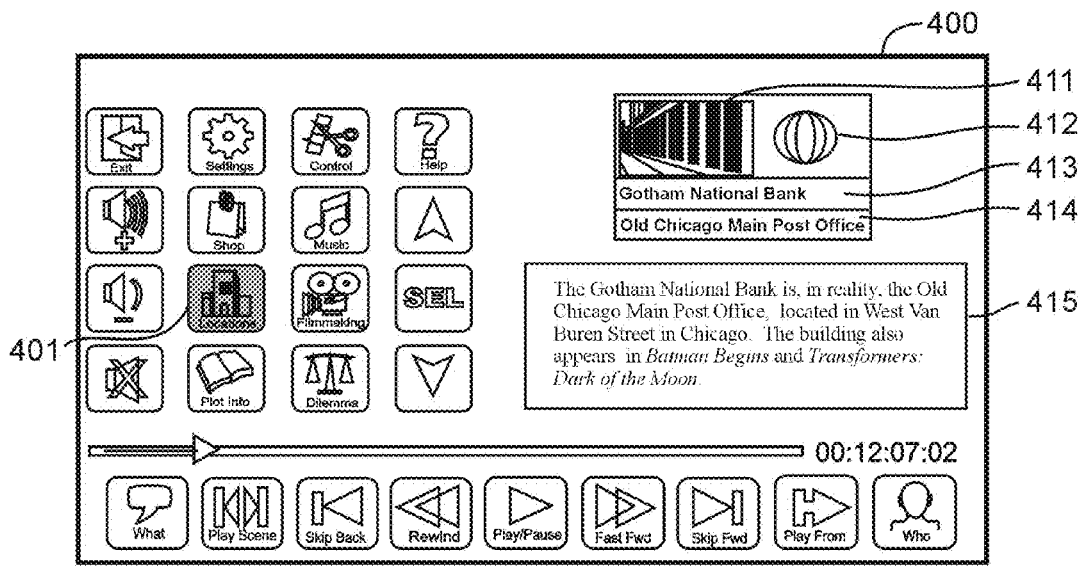
FIG. 4A is an illustration of a second screen display of features of a Locations function.

Responsive to user's preferences and the particular multi-screen embodiment, an indication that information is available is provided on the primary screen (e.g., superimposed over video frames or over the unused portion of the screen, letterbox or curtains (i.e., not superimposed over the video frame). FIG. 4A is an illustration of a second screen display of features of a Locations function 400. In a second screen embodiment, a user upon receiving indications that information is available, e.g., a Locations icon is displayed on the primary screen, and/or the Locations function control is highlighted 401, the user may elect to enable a display of Locations information by activating the Locations function control 401.

In the illustration of FIG. 4A, the Locations information comprises an image of the locale 411, a globe icon 412, an identification of the depicted locale 413, and an identification of the actual locale 414. The image of the locale 411 helps distinguish among multiple locales that may be identified at this location, clip or period. Additionally, the image of the locale 411 enables the user to directly access, for example, a SUB presentation of the locale, a plurality of video segments from within the video depicting the locale, or a write-up 415. Preferably, in a second screen embodiment, the write-up 415 is provided with the other particulars of the identified location.

Optionally, as illustrated, the image of the locale 411 is focused on the portion of the video frame depicting the target locale. Alternatively, the image of the locale 411 is a video presentation of the locale rather than a single image. The globe icon 412 enables a user to automatically retrieve a geographical map locating the locale. Each of the identifications 413 414 enable the user to automatically retrieve, for example, corresponding website pages where additional information is available.

In the example of Locations function, a user may request the display of a geographical map locating the locale. To that purpose, a video map, associates, for example, a Google map link with a video location (e.g., a segment definition). https://www.google.com/maps/@41.8767574,-87.6394313,3a, 75y,102.34h,93.34t/data=!3m4!1e1!3m2!1sTICI1ltiA5J6fii4e HapoQ!2e0 is an example of Google map link for a locale at 433 West Van Buren Street, Chicago, Ill. 60607 showing the Old Chicago Main Post Office depicted in the motion picture The Dark Knight. The Google map link includes a substantial amount of data (e.g., parameters). For example, a URL that starts with "www.google.com/maps/@" and with a "1e1" second parameter identifies a Street View, with a "1e2" second parameter it identifies a Panoramio, and with a "1e3" second parameter it identifies a Simple Map. Latitude and longitude are identifies by the data that immediately follows www.google.com/maps/@ (e.g., 41.8767574,-87.6394313). Similarly, the link's data provides a heading (e.g., 102.34h), and a pitch (e.g., 93.34t).

Figure 4B:
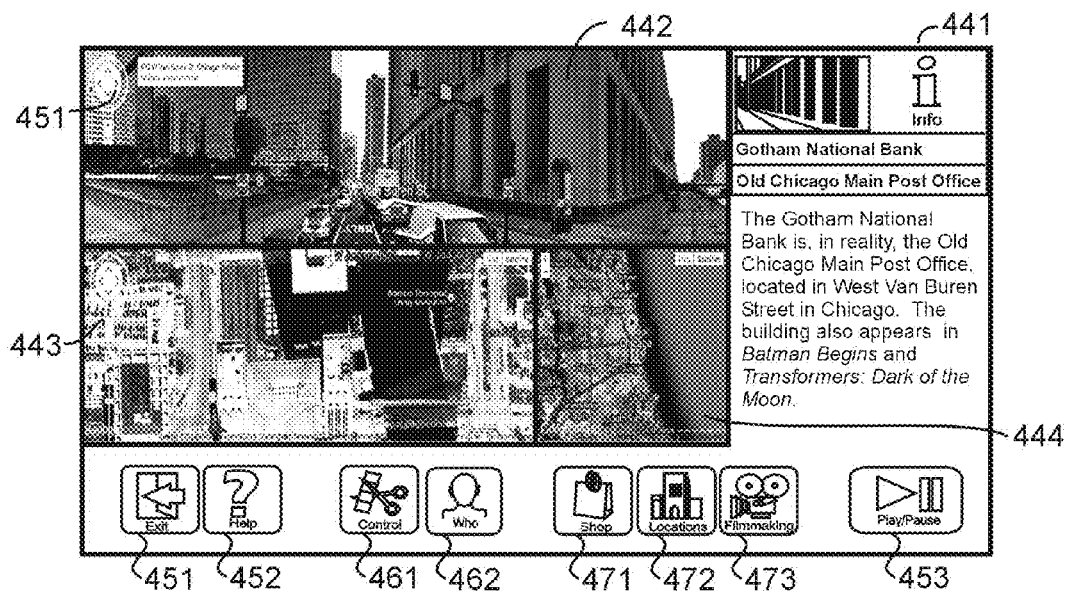
FIG. 4B is an illustration of a second screen display of a set of geographical maps.

FIG. 4B is an illustration of a second screen display of a set of geographical maps that are displayed responsive to a user activating a geographical map display function (e.g., activating the Locations notification icon, the Locations control function, or the globe icon), or responsive to a preestablished preference for a continuous activation of the Locations function. The second screen display 441 provides three separate map views generated by parsing the data provided by the above Google map link, inserting the desired parameters into HTML templates, and utilizing the Google Maps Javascript API. The map on the top of the screen 442 is a Street View. The map on the lower left 443 of the screen is the same latitude and longitude as the Street View but displayed as a map, not as a Street View. The map in the bottom right hand 444 of the screen is the same latitude and longitude but 6 levels less of zoom if the original zoom was smaller than 16. If the original zoom level was 16 or more, then it uses an arbitrary zoom level of 10. A similar method is used in the case of a Panoramio. As is depicted in FIG. 4B, each of the views provides a different perspective and provides individual separate navigation 451, e.g., movement and magnification.

Exemplary embodiments comprise: receiving, on a second screen device, synchronizing information that is responsive to a playing of the video on a primary screen device; establishing, responsive to the synchronizing information, a synchronization to the playing of the video; retrieving (downloading, over a communications network and to a memory of a second screen device, and/or retrieving from a memory of a second screen device) a linkage to a geographic map, a write-up, and an actual identity of a locale, each corresponding to a locale depicted in the playing of the video; parsing the linkage to the geographic map to enable a display of multiple geographic map views each corresponding to the locale depicted in the video, each of the geographic map views providing a different perspective and individual navigation; and simultaneously displaying the multiple geographic map views, the write-up, and the actual identity of the locale, on the second screen device responsive to a time period offset synchronization to the video playing on the primary screen device, the time period offset synchronization being responsive to a user's time period offset preference, whereby the display of multiple geographic map views on the second screen device lags a playing, on the primary screen device, of the corresponding locale depicted in the video.

Alternatively, or in addition, to the parsing of a single link, multiple links corresponding to a single locale depicted in a video may be downloaded to the second screen device and/or retrieved from the second screen device to access single/multiple map views and/or related information from a single or multiple sources of map views and related information. Generally, a displaying of supplementary information (e.g., multiple geographic map views) on the second screen device responsive to a synchronization to the video playing on the primary screen device does not by itself establish the precise point at which the supplementary information begins to be displayed or is discontinued form being displayed. In other words, a displaying of supplementary information may be responsive to a synchronization to a video playing while at the same time being responsive to another consideration (e.g., a user's preference, the particulars of the function, and the nature of the information such as the capability to navigate a displayed geographic map view). Further, a simultaneously displaying should be understood as being responsive to, for example, different response and download times, and occurring contemporaneously (e.g., a similar period of time). The term contemporaneously is not limited to the same time. For example, information being displayed contemporaneously with a depiction of related content, may be displayed after the completion of the depiction of related content provided that such delay is functionally advantageous, or responsive to a user's preference or system default.

The particular second screen embodiment that is illustrated also comprises an Exit control 451, a Help control 452, a play/pause control 453, and in-video functions generally available (e.g., Control 461, and Who 462). Further, the exemplary second screen advantageously includes context sensitive controls that also serve to identify the availability of information that is responsive to the play location. In this example, responsive to what is depicted in the movie the context sensitive controls include a Shop control 471, a Locations control 472, and a Filmmaking control 473. In this interface, the Locations control 472 serves to, for example, toggle the display of Locations information between the map and other locale information, and to bring the maps to full screen.

Plot Info Second Screen Function

The Plot Info function provides plot information, rationale, or explanation. Data created for, or utilized by, the Plot Info function comprises, for example: a segment definition; a plot explanation for a plot point depicted within a segment of the movie; and a linkage to more detailed information. For example, in the motion picture Inception, a totem (e.g., a spinning top) plays a key function in understanding key principles in the movie. Advantageously, throughout the movie the Plot Info function provides the user the opportunity to obtain explanations relating to the totem. A segment definition defining a video segment beginning at video frame 22707 and ending at video frame 23432, depicts a totem, and is associated with the following plot explanation: "In Inception, a totem is a small object, unique to each person, that a person must carry at all times in order to be able to distinguish dreams from reality." Viewing a motion picture with the Plot Info notification function enabled is particularly beneficial in a second viewing of an intellectually challenging motion pictures like Inception and the Matrix. A video map may associate the segment definition with a generalized additional information link (e.g., http://en.wikipedia.org/wiki/Inception_%28movie%29) or a plot specific additional information link (e.g., http://dharmafolk.org/2011/01/10/whats-your-inception-totem/)

In important feature of the Plot Info function is to bring attention to certain clues as they occur in the video. Clues are easily-missed items or moments that are important to obtaining a complete understanding of a movie. These may be the little things a viewer does not normally notice until a second viewing of a movie. The Plot Info explanation for a clue draws the viewer's attention to an important element without spoiling the movie or giving away too much. For example, in the movie Inception, the "Cobb's Wedding Ring" Plot Info notification appears the first time Cobb's ring is easily visible for a long enough period of time. A Plot Info clue notification merely draws attention to this detail without any further explanation of significance. Later in the movie, when the viewer has seen Cobb wearing his ring inside of known dreams and not wearing his ring outside of dreams, the Plot Info function can now explain the apparent significance of the ring.

A second screen embodiment is particularly advantageous in those instances that a movie's plot turns on certain clues since it enables a user to obtain clue information without impacting the viewing of others that may be present. To that end, a user may prefer that Plot Info notification relating to plot information in general and/or clues in particular are not displayed on the primary screen. Further a viewer may prefer to obtain plot information, but would prefer not to be assisted with recognizing clues. To that extent the video map further distinguishes the type of Plot Info (e.g., plot explanation, plot summary to this point, clue), the second screen Settings function enables the user to preestablish which category or categories Plot Info notification will be active and for which category or categories Plot Info information is displayed.

Figure 5:
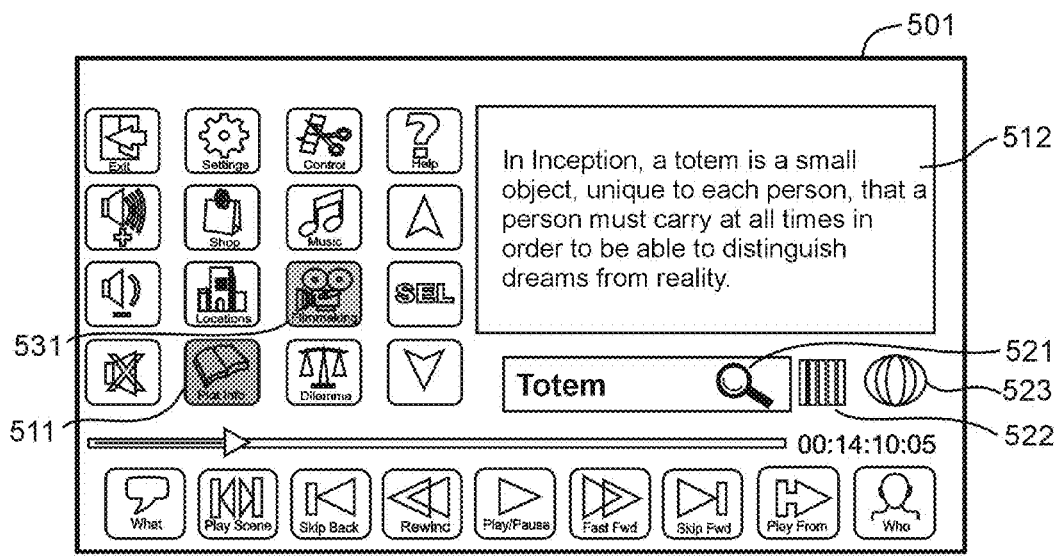
FIG. 5 is an illustration of a second screen display of features of a Plot Info function.

FIG. 5 is an illustration of a second screen display of features of a Plot Info function. In this exemplary second screen embodiment 501, responsive to the current video play position and the video map, the display of Plot Info function control 511 is highlighted. Following a user's activation of the Plot Info function, a context sensitive on-screen plot explanation is displayed 512. Alternatively, the context sensitive on-screen plot explanation 512 is displayed automatically without the user activating the Plot Info function 511 at that particular point. The on-screen plot explanation 512 may remain displayed on the second screen 501 until a next information display, the user toggles the Plot Info control 511, or after a predetermined period of time.

The Plot Info function, taking advantage of the Search feature of the player application, also provides the user the capability to automatically search 521 for instances of the same plot point, and obtain progressively fuller plot explanations. Similarly, taking advantage of a SUB feature, the user is provided the means to play a presentation of the plurality of video segments within the video relating to the particular plot point (e.g., the totem) 522. Further, a linkage may be provided to external information or discussion on the topic 523. As illustrated in FIG. 5, in a preferred embodiment each category of additional information (e.g., keyword search 521, SUB playback 522, link to dedicated location, and external link to third party websites 523) would have their own identifiers that may be recognized across the various features and functions of a second screen application.

Filmmaking Second Screen Function

The Filmmaking function provides cinematic technical information and explanation on how a scene, clip, or segment was created. The '721 publication's disclosures with respect to the How Function ¶¶0130-0139 are incorporated herein by reference and may be implemented as complementary or alternative second screen embodiments.

Data created for, or utilized by, the Filmmaking function comprises, for example: a segment definition; a write-up to provide, for example, an in-video explanation of how the shot, clip, or scene was filmed/created; a linkage to more detailed technical information, and a linkage to video specific information. Filmmaking information may also include a playable clip of the sequence from the movie, a playable video from behind the scenes, production photos and other pictorial material, playable audio track from the director's commentary, and/or any other information that a user of the Filmmaking function may deem informative and/or entertaining. As herein defined, a write-up is not limited to the written word. Specially, with the Filmmaking function, it is particularly advantageous that the write-up be, in fact. a multimedia presentation including video and audio (e.g., a video) to better explain a particular cinematic technique. The video presentation should be brief to enhance, rather than detract, from a conventional movie playback experience.

The Filmmaking function is principally dedicated to cinematography as art and as technique. For example, in the motion picture Citizen Kane, the video map defines a segment by frames numbers 39903-40330. The segment relates to the scene when Kane's business manager and Kane's personal banker are reading a contract that relinquishes Kane's involvement with his newspaper after it has gone bankrupt. Kane enters the frame and slowly walks towards the back of the office. The background behind Kane is a wall of windows, seemingly of normal size. As he keeps walking, the wall appears much higher and further away than it initially seemed and Kane appears to be dwarfed by it. The write-up to support the Filmmaking function comprises the following explanation: "The director, Orson Welles, and cinematographer, Gregg Toland, used a combination of forced perspective and deep focus cinematography. In forced perspective, an optical illusion is created to depict a subject or object to appear farther away, closer, larger, or smaller than it actually is. The set of the office was built on an enormous scale, with the office being much larger and the walls much taller than they appear. Deep focus allows objects in the background (in this case, Charles Foster Kane) and foreground (Mr. Bernstein and Thatcher) of a shot to be simultaneously in sharp focus." The video map associates a forced perspective and a deep focus wiki links to provide additional technical information.

Advantageously, a Filmmaking second screen embodiment enables a user to obtain information on the second screen while at the same time the video is available for playback functions on the primary screen. For example, a user may, while reading an explanation of a clip on the second screen, rewind and analyze the movie clip on the primary screen.

The Filmmaking function may implement an interface similar to that of, for example, the Plot Info interface illustrated in FIG. 5, The display of Filmmaking control 531 is highlighted and the context sensitive on-screen Filmmaking information is displayed. In this instance, the cinematic information identifies the particular technique utilized (e.g., Jib Up). The Filmmaking function, taking advantage of the Search feature of the second screen application, also provides the user the capability to automatically search for instances of the same filmmaking technique. Similarly, taking advantage of a SUB feature, the user is provided the means to play a presentation of the plurality of video segments within the video relating to the filmmaking technique. Further, a linkage may be provided to external information or discussion on the topic.

Dilemmas Second Screen Function

The Dilemmas function identifies depictions of conflicts between two competing moral principles such as compassion, financial responsibility, obligation to employees, parental responsibility, pursuit of soul mate, and self-actualization. A Dilemma is a segment or a set of segments that depict a character (also referred to as the agent) facing a decision in which two moral principles are in conflict. A video map defines each segment or a set of segments that defines a Dilemma and provides a dilemma title, a relationship descriptor, and two competing moral principle descriptors. A relationship descriptor is one of a number of possible descriptors that categorizes the social relationship of the agent, e.g., Spouse/Romantic Partner, Parent/Child, Family, Social Relationships, Government, Business/Profession, and Inner Self To facilitate search across a plurality of movies, the relationship descriptors and the moral principle descriptors are standardized. The video map may also comprise a more detailed identification of the moral principles, a generalized moral dilemma question that is subject matter related to the moral dilemma depicted within the video, a dilemma write-up to provide, for example, an explanation of the specific moral dilemma being depicted; a linkage to in-depth philosophical analysis, a rating, and/or any other information that a user of the Dilemma function may deem informative and/or entertaining An example of a Dilemma is depicted in the movie Spider-Man 2 when Peter Parker's secret identity as Spider-Man has finally been revealed to Mary-Jane. She now knows why Peter has been so resistant to pursuing a relationship with her: if his enemies knew his real identity, it would endanger the people that he loves. In this example, the relationship descriptor is "Spouse/Romantic Partner" and the two moral principle descriptors are "Pursuit Of Soul Mate" and "Protection Of A Loved One".

Figure 6:
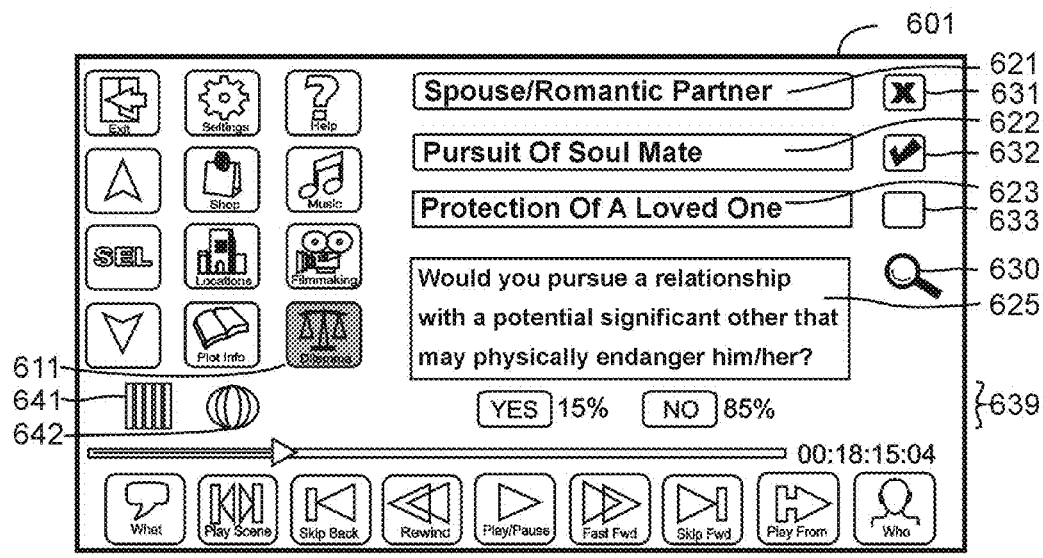
FIG. 6 is an illustration of a second screen display of features of a Dilemma function.

FIG. 6 is an illustration of a second screen display of features of a Dilemma function. In this exemplary second screen embodiment 601, responsive to the current video play position and the video map, the display of Dilemma control 611 is highlighted, and context sensitive on-screen Dilemma information is displayed. In this illustration, the Dilemma information identifies a relationship descriptor 621 (e.g., Spouse/Romantic Partner), and a first moral principle descriptor 622 (e.g., Pursuit Of Soul Mate), and a second moral principle descriptor 623 (e.g., Protection Of A Loved One). The Dilemma information also comprises generalized moral dilemma question 625 that is subject matter related to the moral dilemma depicted within the video (e.g., "Would you pursue a relationship with a potential significant other that may physically endanger him/her?"). A specific moral dilemma question would ask what the user would do in the situation depicted within the movie (e.g., take the place of Peter Parker/Spider-Man).

The Dilemma function enables a user to selectively search, individually or in combination, a relationship descriptor 631, a first moral principle descriptor 632, and/or a second moral principle descriptor 633. To facilitate the search, drop-down lists are provided for each field. In this example, Boolean capabilities are included by toggling a search box to indicate an exclude condition 631 (an X mark), the include condition 632 (a check mark), or a do not consider condition 633 (a blank box). Activating the search control 630 would cause a list display of the matching Dilemmas. Alternatively, since in one embodiment the default condition is a match, the user may automatically search for instances of a dilemma having the same moral principles in conflict by activating the search control 630.

The Dilemmas function is advantageously designed to stimulate discussions among viewers regarding the moral dilemmas depicted within a movie. It provides an opportunity to compare and contrast the decisions viewers would make under similar circumstances, and to stimulate intellectual discussions that reveal an individual's character and values. A moral dilemma presentation can serve to stimulate family conversations that could lead to a child's moral development and character growth. Within a classroom, teachers may use moral dilemma presentations to showcase ethical practices and moral principles relevant to their subject matter.

A Dilemma second screen embodiment, responsive to a user's preferences, is configured to facilitate any of a number of educational, informative, and/or entertaining activities. For example, in one second screen embodiment, one individual (e.g., a parent/teacher) has access to the relationship descriptor and the moral principle descriptors and is able to query others (e.g., children/students) to identify them.

In an alternate embodiment, immediately after a Dilemma has been presented during a playing of the video on a primary screen and before the outcome is depicted, the playing of the video is automatically paused. On a second screen the user is presented with a set of moral principles descriptors (e.g., drop-down lists) to enable the user to select a first moral principle descriptor 632 and a second moral principle descriptor 633. The set of moral principles descriptors may be a subset selected from a wider set of moral principles descriptors. The subset is chosen for applicability and ease of distinction (e.g. reduce similar moral principles). Once the user has selected two moral principle descriptors, the second screen indicates which moral principles are appropriate (e.g., the second screen displays a first moral principle descriptor and a second moral principle descriptor determined to be most applicable to the moral dilemma). The descriptors determined to be most applicable may be responsive to, for example, expert evaluation and/or community responses. In a preferred embodiment, the playing of the video on the primary screen is automatically resumed at a suitable point prior to the paused position.

Alternatively, or additionally, a user is provided an opportunity to answer (e.g., YES or NO) the Dilemma question 625. A user's answers are tabulated and summarized at the end of the video to inform the user of how the user's decisions compare to the agents in the movie (e.g., what the characters decided), and/or compared other users' answer 639 to the generalized moral dilemma question. An entertaining psychological profile mat by provided the user that is responsive to the user's and community replies. Additionally, responsive to the user's preferences, Dilemma answers may be posted to social media, and otherwise shared with friends (e.g., emailed), and the Dilemma community at large. Aggregation of the data may provide a reading on the moral compass of a culture, and other opportunities for research.

In a list mode, Dilemma replay function control 641 enables replaying the various previously played segments of the video that precede the decision point and that assist the user in recollecting the relevant details and context of a Dilemma. Further, a linkage may be provided to external information or discussion on the topic 642.

Trivia, Info, and Identification Second Screen Functions

A video map's Trivia function data comprises a segment definition and/or frame identification, a question, a set of multiple choice answers, an identification of a correct answer, a write-up, and linkages to related information. Generally, the point at which a trivia question is displayed and the subject matter of the trivia question is related to content currently or recently depicted in the playing of the video, such as a noteworthy moment, item, action, performer, character, location, dialogue, fashion, film production, special effect, and production error. Additionally, the subject matter of the trivia question may be related to topics of general interest or indirectly related to the video such as awards, budgets, and performer information.

For example, in the motion picture Captain America: The First Avenger, a video map identifies a play position in the movie at frame number 69822. The preceding segment, defined by frame numbers 69536-69821, is the first depiction in the movie of Steve Rogers in his Captain America uniform. A trivia question related to the content being currently/recently depicted, comprises the following "Actor Chris Evans, who plays the role of Captain America, also starred as a superhero in which Marvel movie?" The answers which in this example, are directly related to the content being depicted comprise: "(A) Fantastic Four as Johnny Storm, (B) Spider-Man as Harry Osborn (C) Daredevil as Matt Murdock (D) X-Men Origins as Wade Wilson".

Additionally or alternatively, the map's Trivia data may be presented as information without requiring a user to answer a question. A write-up to support the Trivia function may also provide additional information and facts. For example: "Actor Chris Evans, who plays the role of Captain America, also starred in the 2005 Marvel movie the Fantastic Four as Johnny Storm, The Human Torch." The video map also associates the trivia item with other internal/local or external/remote source of related information (e.g., Wikipedia website page).

Figure 7:
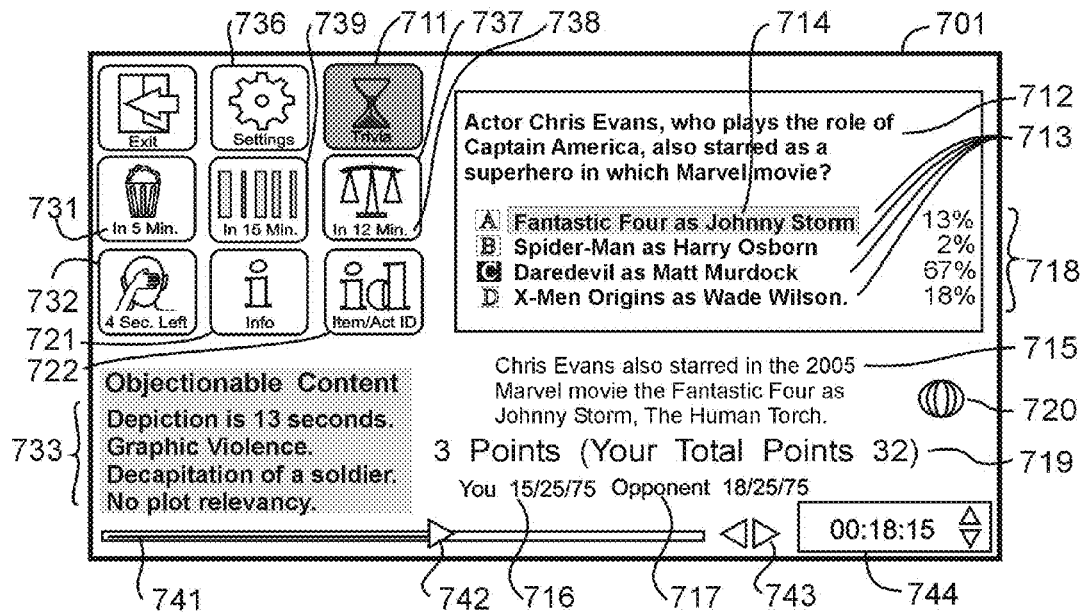
FIG. 7 is an illustration of a second screen display of features of a Trivia and notification functions.

FIG. 7 is an illustration of a second screen display of features of a Trivia function. In this exemplary embodiment, there is no communication from the second screen (e.g., tablet) to the primary screen (e.g., television). Thus, the depicted interface 701 lacks the remote controls included in other interfaces. The video map is synchronized to the video played on the primary screen, and is thus able to identify the current play position in order to perform the various notification functions (e.g., Trivia 711).

In the event that the Trivia function has been activated, and responsive to the video map identification of when during the video the trivia notification is to be made (e.g., displayed, audible, and/or vibration), at the appropriate point during playback, the Trivia function control is, for example, highlighted 711. A Trivia Game function comprises a display of, for example, a Trivia question 712 and a set of multiple choices answers 713 (e.g., A B C D). Following a user answer indicating a selection of one of the answers (e.g., option C), the correct answer 714 is identified (e.g., shaded answer). The Trivia function supplementary information may further comprise a fuller explanation of the correct answer including additional information 715 (e.g., the movie released in 2005).

Additionally, a tally of correct answers, asked questions, remaining questions for the user 716; statistics of a competitor(s) playing on a separate second screen(s); and statistics relating to how other users have replied to the question 718 (e.g., percentages in each of the options) may be provided. Further, a user's scores across a series of movies may be ranked among a circle of friends and the general community of users. In a competition mode, a time limit to answer a question is implemented and is response to the expected time required to read the question and the optional answers. Further, the trivia questions may be associated with a level of difficulty and point for a correct answer are awarded 719 based on the level of difficulty (e.g., a 1 being the lowest level and a 5 being the highest level) and total points are tabulated. Optionally, a user may specify a level of difficulty as well as the category types that are presented. To support the later, a video map's Trivia data would also categorize (e.g., Cars In Movies) the trivia questions.

A Trivia function's supplementary information may also comprise a link to an external/remote source of related information. In that event, an external information icon 720 is displayed to indicate the availability of additional information relating to the subject of the particular trivia question (e.g., Chris Evans' Wikipedia page).

Generally, as in other functions, responsive to a user's preestablished function preferences, the display of a trivia information item or a trivia question is responsive to the content being depicted in the video. Alternatively, a display of a trivia information or question is responsive to a user's general preestablished lack of interest in a content (e.g., Explicit Violence category, commercials) being currently depicted. Further, a display of a trivia information or question is directly responsive to a user's specific request at a play position during a playing of a video. Specifically, while viewing a broadcast movie comprising commercials (e.g., 30 second promotional advertisements), a user's activation of the Trivia function control 711 would cause the display of, for example, the next available trivia question 712 and corresponding answers 713 in the list of available questions, and/or a display of a trivia question 712 and answers 713 most relevant to the immediately depicted video content. In an embodiment where the occurrence of a commercial break (interruption) during the playing of a video is identified (e.g., a match or mismatch of the acoustic signature to the acoustic database), and responsive to a user's preestablished preference, a second screen function routine (e.g., trivia questions) is automatically enabled.

Similar to the Trivia function and the Dilemma implementations is a personality quiz implementation. Preferably in a list embodiment several personality questions are asked to accumulate enough information to correlate the user's answers with one of many characters in a video. A video map would identify a plurality of characters in a video, and associate specific answers from a set of multiple choice questions with each character. The individual answers are drafted, balanced and may be individually weighted to provide a user, if not an entirely accurate psychological analysis, at least an entertaining experience. Not every answer need be relevant or critical to the analysis. Questions may be associated with any set of performer/characters (Superheroes in The Avengers), objects (Cars in The Fast and the Furious), or group (Families in The Godfather). After answering a set number of questions the user is informed of which character/object/group their answers are associated with. Alternatively, the choices a user makes while answering the Dilemmas questions can be collected, analyzed and correlated to a performer/character's traits.

An Info function control 721 provides access to detailed information about noteworthy depictions in the movie relating to, for example, items, actions, performer, characters, performer attributes, locations, dialogue, menu items, recipes, world records, and awards. Video map data created for, or utilized by, the Info function comprises, for example: a segment definition; a title; a write-up for a noteworthy item depicted within a segment of the movie; and a linkage to more detailed information. For example, in the motion picture Casino Royal, the video map defines a segment by frames numbers 106739-106983. The segment, titled "Vesper Martini", relates to the character James Bond ordering a martini. The write-up to support the Info function comprises the following recipe: "The Vesper Martini: Ingredients: 3 measures of Gordon's Gin, 1 measure of vodka, ½ measure of Kina Lillet, and Lemon peel for garnish. Directions: Pour the gin, vodka and Kina Lillet into a cocktail shaker over ice and shake (don't stir!) well until ice-cold. Strain into a martini glass and add a lemon peel as a garnish. Drink it with the swagger of a certain British spy, then thwart your enemies and get the girl. All in a day's work." The video map associates the following information link: http://www-.jamesbondlifestyle.com/product/vesper-martini. In one of many possible embodiments, the display and frequency of Info function information is similar to that of the Plot Info function.

An Identification (ID) function control 722 provides access to a display of identification information relating to, for example, the depiction of items, actions, performer, characters, performer attributes, and dialogue. The ID function control 722 enables selective retrieval of identification terms and keywords at a user's requests. Data created for, or utilized by, the ID function comprises, for example: a segment definition; a list of keywords for a noteworthy depiction within a segment of the video; the category of the depiction (e.g., automobiles, apparel, martial arts), and a linkage to more detailed information. Examples of ID information include: "Trinity's dark green motorcycle Ducati 996" in the movie The Matrix Reloaded; "James Bond's 007 weapon gun machinegun SMG HK Heckler and Koch UMP9 with suppressor silencer" in the movie Casino Royale; Carrie Bradshaw's wedding dress gown couture Vera Wang strapless long frills in white cream in the movie Sex and the City.

By contrast to the Info function, in a preferred embodiment the frequency of the availability of ID function information is similar to that of the Who function. In such as case, there is no need to notify the user of the availability of information as the video is being played, as the user would activate the ID function when motivated by what is being played on the primary screen. Alternatively, responsive to a user's preferences for a particular category of information items (e.g., automobiles, apparel, martial arts) the ID icon 722 on a second screen notifies a user that detailed ID information is available for a noteworthy depiction of general interest to the user. Further, responsive to a user's preference, ID information may be contemporaneously displayed on the second screen as the video is being played. If multiple noteworthy items appear at the same time the user may choose to view any or all of the information.

FIG. 7 also illustrates a number of advantageous second screen notification functions. A Snack notification function 731 informs the user of an upcoming appropriate moment in the video (e.g., 5 minutes from the current play position) for a trip to, for example, the refrigerator to obtain snack. The function may additionally inform the user as to the length of the particular segment (e.g., 2 minutes) and the nature of the content (e.g., gratuitous action). Thus, in this example, a user wishing to be informed of suitable moments in the video, is informed that in 5 minutes from the current play position, there is a 2 minutes window of gratuitous action that can be missed in order to get popcorn. This particular notification function is particularly advantageous in a smartphone application that will silently and inconspicuously inform the user of a suitable restroom break point in a lengthy motion picture. The application is useful in a public setting (e.g., theater) as well as in a private gathering of a number of individuals. (e.g., friends at a home). The Snack notification function may be in active notification mode and/or available in query mode.

As is the case with the Snack notification function, every other function and notification function disclosed herein may also advantageously implement notification routines that provide a running time clock to the next item that is responsive to an in-video function that is of interest to the user. FIG. 7 illustrates an example in which a user, having preestablished (e.g. the Settings function control 736) or concurrently established (e.g., pressing the Dilemma function control 737) with the playing of a video an interest in a function (e.g. Dilemma), is provided the amount of time to the next information display (e.g. "In 12 Min." 738) that is responsive to the desired function (e.g., Dilemma 737). A user may activate at any moment a time notification routine (e.g., pressing a function control icon) to obtain an indication of the amount of time, instances, scenes, and/or chapters till the display of information for the corresponding function.

A similar routine may also be implemented with other video map segment data. For example, while playing the motion picture Matrix Reloaded, a user may desire to know how long before the next martial art scene. In that instance, software routines, for example, identify the keywords associated with the last completed clip, search the video map data for the next clip with similar keywords, and convert the segment information into a counting down timer. Similarly, every Compilations feature presentation provides the necessary segment data and presentation identification to enable a user to establish a preference for a segment notification that is responsive to the subject of the compilation.

In a second screen embodiment, a user may desire to only view the segments in a Compilation titled "Martial Arts" for the motion picture Matrix Reloaded. In that instance the user activated the Segment notification function control 739, which would cause the display of a list of available compilations or searches. Following selection of a set of segments, the second screen function displays the amount of time to the next segment in the compilation (e.g. "In 15 Min."), thus enabling the user to fast forward or skip to the next responsive segment. While in the segment, the Segment notification function control 739 may instead or additionally display the remaining playing time of the segment (e.g., as in the Content notification function).

In the example of a Who function, the function control may toggle on and off responsive to whether information is available or not for a character being depicted, or in those instances that a character is not present in a clip.

The video map information to drive these and other functions may also be derived from the various presentation features (e.g., 60 Minutes Presentation). Alternatively, video map information is specifically created to support a notification function. For each identified depiction suitable for a notification, the video map information provides an identification of the beginning play position, and duration of the depiction. Optionally, the video map information further comprises a few keywords to identify the beginning of the depiction, a write-up of the depicted content, a rating of the significance if any to the plot, and/or a content category.

Advantageously, the rating and category data enable identifying more suitable points in the video, and enable the implementation of a Snack notification function that is responsive to a user's preestablished preferences. For example, a user may preestablish which time period(s) of the video the notification function is active (e.g., 15 minutes from the start to 30 minutes from the end excluding credits), the frequency of notification (e.g. every 10 or 30 minutes), the type of notification (e.g., audio tone, vibration, lock screen alert, icon highlighted, icon timer 731), the minimum period of time that is required (e.g., 5 minutes), and. advantageously, which categories of content are less important to the user (e.g., Mushiness). The rating, which maybe as simple as an snack icon or bathroom icon, is particularly useful when, for example, the motivation for querying the feature is a snack break rather than a bathroom break.

A Content notification function 732 informs the user that an upcoming potentially objectionable content will be displayed on the primary screen (e.g., 12 seconds from the current play position). The function may provide the user additional information 733, such as the length of the particular segment (e.g., 13 seconds), the category of the content (e.g., graphic violence), and responsive to the user's preference plot relevant information. Upon notification the user may elect to focus attention of the second screen display during the period of time that the Content notification control is highlighted. Advantageously, the Content notification control 732 provides a time remaining countdown and/or written description relating to any information that may be significant to the plot.

As in other second screen functions, a user is provided a range of options for preestablishing preferences for this function. Specifically, with respect to the Content notification function, a content preference interface similar to that previously depicted may be utilized to enable a user to preestablish which categories and levels of explicitness the viewer would prefer to receive Content notifications. The video map information to drive this function may be derived from the Control presentation feature. Alternatively, segment information identifying a beginning and an ending position in each of a plurality of segments, and each associated with a content category and level of explicitness, are specifically created to support the Content notification function. Advantageously, the latter implementation provides a more precise identification of the actual video frames of potentially objectionable content since there is no requirement to consider the quality of the edit if the content were excluded by the Control playback feature. Still further, segment information may be associated with keywords identifying the content to enable a user to preestablish notification parameters by the use of keywords. For example, a user, that deems the depictions of snakes to be objectionable, would enter appropriate keywords to inhibit the display of those types of depictions.

The interface illustrated in FIG. 7 also provides the means for a user to facilitate and/or perform the synchronization of the processing of the video map to the playing of the video on the primary screen. In those instances that a video timecode may not be displayable to the user on the primary screen, a user may utilize the continuous display of ID information and/or video frame thumbnails included with and provided by the video map to synchronize the processing of the video map. A scrollbar 741, thumb 742, and discreet adjustment buttons 743 enables the user to adjust the second screen internal clock current play position 744 to match or effectively approximate the actual play position of the video on the primary screen. Additionally or alternatively, in those instances that a video timecode (HH:MM:SS) is displayable to the user on the primary screen, a user may directly enter/adjust 744 the timecode on the second screen.

Importantly, the illustration of FIG. 7 serves to illuminate the many potential synergies that are available by the combination of functions in a second screen embodiment. For example, a user may preestablish a preference for Control function notification 732, and, when the time of the potentially objectionable content permits, to be automatically presented with, for example, a trivia question 712, or other information available from any other function or external resource. Further, a user, while playing the movie, the user may save an item of interest to be automatically displayed when content of no interest to the user is being displayed on the primary screen. For example, a user may save Shopping function items and Locations function items, precisely for that purpose. In essence, the user dynamically creates commercial interruptions, at a user responsive suitable points in the video, for a product of interest to the user, Shopping/Music Second Screen Function The Shopping function provides information and access to resources, e.g., websites, relating to a currently and/or recently displayed noteworthy item, prop, or location. Website linkages provide additional information and/or the opportunity to purchase a depicted item or obtain a service associated with the depicted location. Examples of noteworthy Shopping items and services include: a life size statue of the T-800 statue from Terminator, the Algerian Love Knot necklace from Casino Royale, Arthur's leather jacket from Inception, and a James Bond bungee jump experience from Golden Eye. The Music function identifies the title of the musical item, the performer, the album, other musical item identifying information, and includes links to a website that can provide additional information and/or the opportunity to purchase the musical item.

With respect to a Shopping/Music function, the disclosures in ¶¶0056-0076, and ¶¶0083-0116 of U.S. patent publication 20130251337, titled "Providing Item Information During Video Playing" are incorporated herein by reference. With respect to a Shopping/Music function in a second screen embodiment, previously incorporated U.S. patent application 20120151509 is incorporated herein by reference.

Figure 8A:
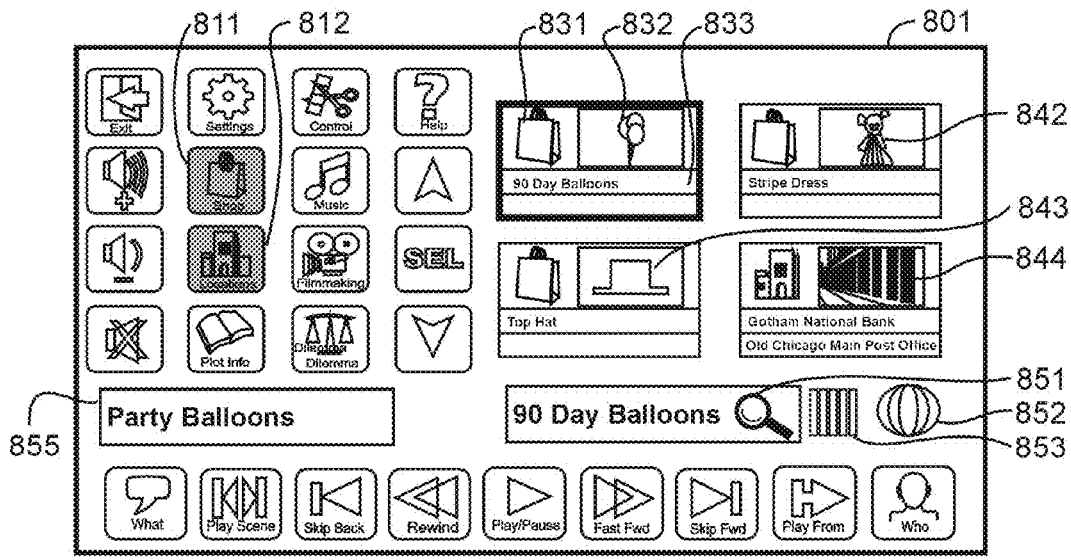
FIG. 8A is an illustration of a second screen display of features of a Shopping function.

FIG. 8A is an illustration of a second screen display of features of a Shopping function. In this particular embodiment, contemporaneously with, or alternatively to, the display on a primary screen of an indication that information is available, an identification of each of the items on which information is available is displayed on the secondary screen 801. In this particular example, the video at this particular play position is depicting three characters: a boy holding balloons, a girl wearing a dress, and a man wearing a hat. In this instance, the play location is monitored for the presence of a purchasable item. The current play location within a video is monitored and a plurality of segment definitions are searched to identify a segment definition that is responsive to the play location.

When a segment definition or frame identifier is responsive to the play location, and during the period defined by the segment definition or associated with the frame identifier, an indication is displayed that item information is available for an item or items being depicted. In this example, an indication that Shopping information and Locations information are provided on the second screen. Although it may not be necessary, in this embodiment, as in previous examples, the display of Shopping function control 811 and the Locations function control 812 are highlighted. FIG. 8A illustrates an identification of multiple Shopping items (i.e., the 90 Day Balloons 832, the Strip Dress 842, and the Top Hat 843) and one Locations item (i.e., The Gotham National Bank 844).

As in previous examples, the identification of the item may be associated with additional information about the item (e.g., a complementary item, a service related to the product, and insurance). Item identifying information comprises, for example, the information category 831 (e.g., Shopping icon), an image or video of the item extracted from within the video 832, and textual identification of the item "90 Day Balloons" 833.

Item identification information (832, 843, 843, and 844) may also serve as a means (e.g., clickable buttons) to enable the user to request additional item information relating to a displayed item information. An item information may constitute a button/object associated with a "clickable" event that when activated would launch the additional information routines. In response to receiving such a request for additional information for an identified item, additional item information, such as purchase information is provided. Many sources either provided or integrated with the video or external to the video may provide supplementary information. Additional item information may be downloaded from a suitable website by means of a link or reference data provided with information associated with, for example, the segment definition or item identifier. Retrieval of additional information may be real-time, or non-real-time and pre-stored in volatile or non-volatile memory for use when needed. While supplementary information comprise many items and categories of additional item information, there is no requirement that supplementary information itself provide any specific information.

The interface, taking advantage of the Search feature of the second screen application, also provides the user the capability to automatically search 851 for instances of the same currently highlighted item (e.g., 90 Day Balloons). Further, in this exemplary embodiment, a user is also provided the capabilities to specify and/or limit/filter the display of information responsive to the user's shopping category, sub-category, or item preferences 855 (e.g., Arts & Crafts, Party Supplies, Party Balloons). Similarly, a user is also provided the means (e.g., Internet icon control 852) to obtain external information or discussion on the topic (e.g., website page), and the means (e.g., SUB icon control 853) to play a presentation of the plurality of video segments (i.e., a Subject) within the video relating to the currently highlighted item.

Advantageously, the item identification routines are configured to search a plurality of segment definitions to identify segment definitions that are responsive to the request location and a predetermined play period prior to the request location. To accommodate those situations, in which at the time that the user has requested item information, the request location may be adjusted to include the request location and a predetermined play period prior to the request location, for example, 30 seconds. In this fashion, a segment definition may be responsive to the information request or a predetermined play period prior to the request location. Advantageously, this method enables the retrieval and display of item information associated with a number of recently played depictions of items having item information available.

A second screen embodiment elegantly supports a continuous display of identification information contemporaneously with the playing of the video. The display of identification information need not require the pausing of the playing of the video. Alternatively, as a user predefined option, the playing of the video may be automatically paused and replaced with the display of the additional item information, while the second screen continues to provide access to the various item identification information controls (832, 843, 843, and 844). In a second alternative, when a user requests additional information, the playing of the video may be automatically paused, and the display on the second screen may be replaced with the display of the additional item information. Any number of permutations between what is displayed on the primary and secondary screen, and in which sequence, are possible.

In an exemplary embodiment, item identification information is associated with a unique identifier. When a user requests additional information, the user's apparatus capable of processing data and instructions executable by a processor, performs the step of providing the unique item identifier to a source remote to the apparatus that is dedicated to maintaining updated detailed additional item information specifically produced and edited for display within the video. The unique item identifier may be accompanied with or incorporate video identification and play location identifiers to obtain additional item information that is responsive to the play location within the particular video. For example, a necklace may appear in connection with different garments, e.g., the Algerian Love Knot in the motion picture Casino Royale is worn by the character with different garments and in different locations. The additional information that may be provided with the necklace item information would be responsive to the particular garment, situation, and/or location depicted in the video at the moment that the user request was received for item information in response to the display of an indication that item information is available. When a user elects to exit the additional information environment (e.g., a page in a website or the Exit control key) a number of different options may be executed as to how the playing of the video is resumed. The ¶0168 disclosures and video playback resuming disclosures in the '721 publication are incorporated herein by reference.

A user may preestablish a preference for the types of shopping categories for which a notification is to be provided and/or for which the retrieval of additional information is to be performed automatically. For example, a user may prefer Shopping notification for only items of jewelry and the automatic retrieval of a website page for the designer version of a jewelry item (e.g., higher priced) rather than the costume jewelry interpretation of the item (e.g., lower priced). The Algerian Love Knot necklace depicted in the motion picture Casino Royale is available from the designer Sophie Harley, and an imitation is available from a costume jewelry website at a fraction of the price.

Figure 8B:
FIG. 8B is an illustration of a second screen display of features of the Shopping function simultaneous display of multi-sourced external information.

FIG. 8B is an illustration of a second screen display of features of the Shopping function simultaneous display of multi-sourced external information. FIG. 8B illustrates an iPad second screen 870 embodiment that is responsive to a user enabling automatic retrieval of the Shopping external information for items as they are displayed on the primary screen, or that is responsive to a user activating the retrieval of the Shopping external information following notification of Shopping information for an item displayed on the primary screen. Responsive to the depiction of the Algerian Love Knot necklace in the motion picture Casino Royale, the Shopping function routines retrieve and display a responsive page from sophieharley.com website 871 depicting the designer jewelry item, from the designer Sophie Harley, at a price at £2,280.00. The Shopping function routines have also contemporaneously retrieved and displayed a responsive page from emitations.com website 875 depicting the costume jewelry version of the item at a price at $176.00.

The Shopping function routines, which, for example, automatically retrieve and display multiple external information, are not limited as to which specific items are displayed. For example, website page of an item (e.g., a blouse) from one merchant may be simultaneously displayed in combination with multiple website pages of complementary items (e.g., a skirt, a silk scarf, an item of jewelry) from the same or different merchants. Similarly, the Shopping function routines are not limited as to the type/format of the information. Combinations of videos, images, website pages, multiple pages from the same website, and/or applications may be utilized. For example, a website page of an item may be combined with an instructional video of the item from youtube.com.

Exemplary embodiments comprise: receiving, on a second screen device, synchronizing information that is responsive to a playing of a video on a primary screen device; establishing, responsive to the synchronizing information, a synchronization to the playing of the video; retrieving a first linkage corresponding to a purchasable item depicted within the video, and a second linkage corresponding to a second purchasable item related to the depicted purchasable item; and downloading, responsive to the first linkage and to the second linkage, and simultaneously displaying on the second screen device, information (e.g., a website page) corresponding to the purchasable item depicted within the video (e.g., the original, authentic, designer, real, fine, or higher priced version of the depicted purchasable item), and information corresponding to the second purchasable item (e.g., copy, knock-off, costume, lower priced, alternative, or complementary product), the displaying on the second screen device being responsive to a time period offset synchronization to the video playing on the primary screen device. In an embodiment where the information is a website page, each corresponding page is independently navigable, and, optionally, each provides a user with the opportunity to place an order for the item directly with the merchant. A designer item (e.g., clothing) usually bears the logo of, or is associated with, a recognizable fashion designer. A costume jewelry, for example, is usually an ornament, accessory, article, or detail used to beautify the appearance of something to which it is added.

As a user views the movie, the user may save items of interest to collections (e.g., "bags") that they name and categorize. At a more convenient time, the user can then review the collected of items, obtain additional information, place orders, post to social media, and otherwise share with friends.

Still further, a user may elect to be notified that an item of interest is available at a local brick and mortar store, and/or, for example, on sale at a preestablished price or discount threshold (e.g., 30% MSRP). Taking advantage of the GPS functions of second screen device, a user may elect to be notified when in proximity to a brick and mortar store that has the item available. To support this function, the video map may further associate with the item information and linkages, the name of the retailer at which the item and other similar items may be inspected and purchased. The notification may provide a clip from the video featuring the item, an image of the item, other previously retrieved information, together with any notes or reminders the user may have created with respect to the particular item.

Control and Preview Second Screen Functions

The Control function enables the customization of a presentation according to a user's content preferences for the level of explicitness in each of a plurality of categories of possibly objectionable content. The application of a user's content preferences to the video map of a video results in the automated logical selection of sequential and non-sequential segments of the selected video that are consistent with the user's content preferences. Any segment, with a content coding higher (abstract) than the user-selected content preference for the corresponding category would not be included in the video produced for the user. The segment selected for viewing would satisfy the presentation preference and would have a coding level equal to or lower than the user specified content preference for that category. If, for example, a user selects, the 60 Minutes presentation and also request that the user's content preferences for the level of explicitness in each of fourteen categories be applied to that presentation, then the resulting "Custom 60 Minutes" presentation may be reduced to 55 minutes.

A viewer may preestablish content preferences prior to playing any video, prior to playing a specific video, and may modify the content preferences during a playing of the video with the new content preferences being applied as the playing of the video resumes or continues. Advantageously, video specific content preferences will display only the options for which content is actually present in the video. For example, if the video does not contain any depictions of Gore, the Acceptable Level Of Explicitness will be set at None irrespective of any generalized preestablished content preference.

Advantageously, a user may preestablish different set of content preferences to be applied to the different features and functions. For example, a user may prefer that the Presentations (e.g., Action and 60 Minutes) be responsive to the content preferences, but would prefer that no content preferences or limited content preferences be applied when the Search function or Best Lines feature are being utilized. Still further, content preferences may be preestablished broadly, preestablished separately for various genres, types, and classes of videos, and contemporaneously and specifically to a video. A user may preestablish different set of content preferences to be applied to the different genres of motion pictures. For example, the set of content preferences applied to a romance would be different than the set applied to an action movie. Still further, individualized set of content preferences may be established for each of a plurality of users in a household, be password protected, with supervisor limits set by category.

Figure 9A:
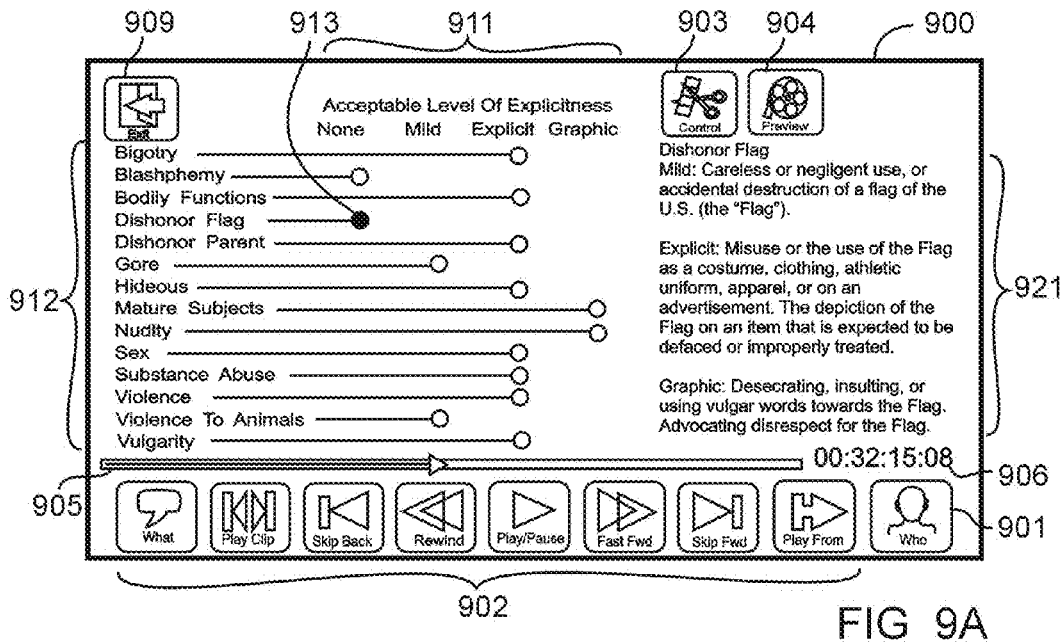
FIG. 9A is an illustration of a second screen interface for establishing content preferences.

A Control second screen function advantageously provides for an adjustment of content preferences without interruption of the playing of the video. FIG. 9A is an illustration of a second screen interface for establishing content preferences. The content preference interface 900 enables a user to establish content preferences on a second screen during a playing of the video on a primary screen. A second screen user interface embodiment advantageously provides the means for touch screen controls as are available in smartphones and tablets.

A second screen embodiment, as illustrated in FIG. 9A, combines a content preference selection interface and remote control capabilities. This particular second screen embodiment, as an example of the various possible combination of elements, relocates the Who in-video function control 901 to the right of the playback function controls 902, and includes a Control function control 903, a preview function control 904, video timeline navigation control 905, and a current play position identifier 906 (e.g., current play time in an HH:MM:SS:FF format) and/or remaining playtime from the current position.

The Control function control 903 enables the display of a Control interface. The Control interface enables a user to establish content preferences for the level of explicitness 911 (i.e., None, Mild, Explicit, or Graphic) in each of fourteen categories of possible objectionable content 912 (i.e., Bigotry, Blasphemy, Bodily Functions, Dishonor Flag, Dishonor Parent, Gore, Hideous, Mature Subjects, Nudity, Sex, Substance Abuse, Violence, Violence to Animals, and Vulgarity). In the example illustrated in FIG. 9A, a user indicates content preferences by touching a particular button 913 associated with a preferred level of explicitness. The user in this case has elected to omit depictions of Dishonor Flag during a playing of the video.

In this embodiment, the Control second screen interface 900 combines a Control content preferences matrix 911-912 with a description 921 of the various levels for a currently selected, last selected, or otherwise indicated content category 913. A context responsive help control or second touching of the Control function control 903, would provide the description 921 summarizing the nature of the potentially objectionable content that is excluded at a particular level of explicitness. An Exit function 909 activates the display of a generalized interface.

A novel and material advantage of a second screen embodiment for establishing content preferences is that a user may adjust content preferences without interrupting the viewing by others and without informing others of the changes. This is especially advantageous while children may be viewing a movie and a parent or supervisor determines that the incidence of certain content (e.g., Explicit Violence) is deemed excessive.

Figure 9B:
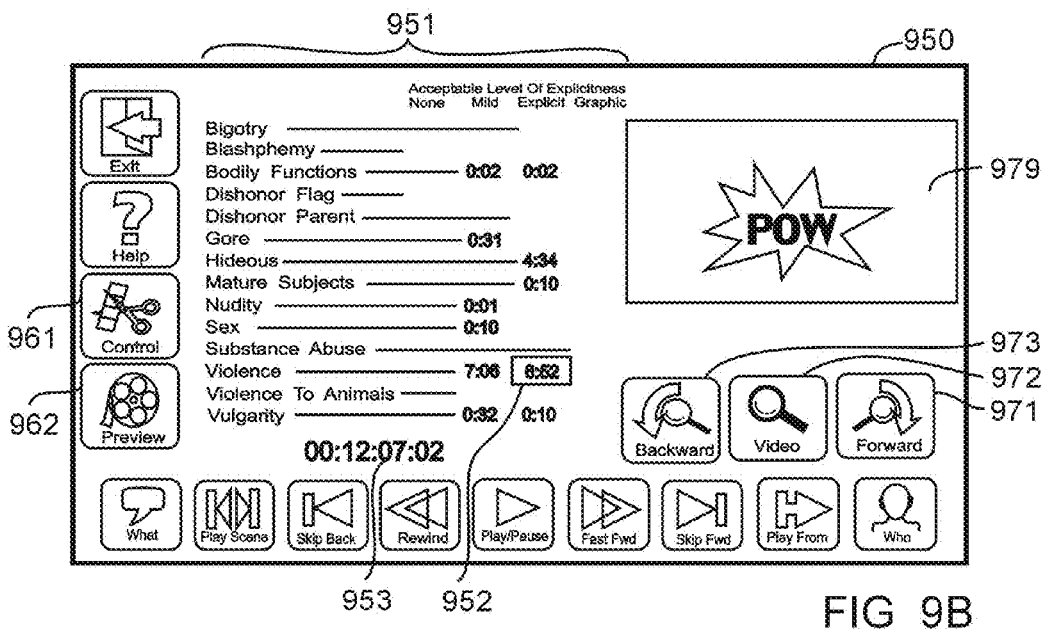
FIG. 9B is an illustration of a second screen interface for establishing content preferences and previewing content.

FIG. 9B is an illustration of a second screen interface for establishing content preferences and previewing content. This interface 950 combines a content preference selection matrix with information indicating the amount of possibly objectionable content in a level of explicitness for a content category. This particular matrix advantageously displays, responsive to the content preferences of a user, how much possibly objectionable content remains to be played from the current position 951. The information may be provided in terms of instances and/or duration, e.g., accumulated time in minutes and seconds 952. To further explain, at twelve minutes, seven seconds, and two frames into the video 953, for a user with a preference for an Explicit level of Violence, six minutes and fifty seconds of Explicit Violence and seven minutes and six seconds of Mild Violence will be depicted, and Graphic Violence will not be depicted. In this particular embodiment, a user may increase or decrease a level of explicitness by toggling a level of explicitness in a content category.

While, the principal object of the video map data relating to potentially objectionable content is to support a user's preferences to inhibit the playing of content generally deemed objectionable by the user, another object of the data is to enable a user to preview and play the potentially objectionable content. Activating the Preview function control 962 enables the Preview function interface features and routines. Activating the Control function control 961 returns the interface to content preferences establishing mode. The playback routines associated with, for example, the content preference selection interface, provides an elegant means to cause the playback of the content associated with any desired category or level of explicitness. For example, a viewer wishing to preview the forthcoming potentially objectionable content categorized as Explicit Violence, would touch the corresponding level of explicitness control 952 and then touch a forward search Preview function control 971. A video search Preview function control 972 activates routines that retrieve all the responsive depictions within the video. A backward search Preview function control 973 provides a backward limited retrieval.

In this example, responsive to user preferences and the particular second screen embodiment, following activation of the forward search Preview function control 971, the playing of the video on the primary screen is automatically paused, and the content categorized as Explicit Violence that takes place from the current play position 953 (e.g. 00:12: 07:02) is played in the primary screen and/or in a window 979 on the second screen. In other words, advantageously a look forward anticipatory preview is limited to segments including depictions with a time stamp in the future of the current play position 953.

The advantages of a look forward anticipatory preview search are further enhanced by another embodiment, in which the playing of the video on the primary screen is not paused, and advantageously a list and description (e.g., text, image, and duration), of each of the segments depicting the potentially objectionable Explicit Violence, is displayed on the second screen. This will permit a user (e.g., parent or supervisor) to adjust content preferences to be applied to the balance of the playing of the video, without disturbing the viewing by other users, and without necessarily being subjected to the actual depictions of the possibly objectionable content.

Ratings Second Screen Function

Figure 9C:
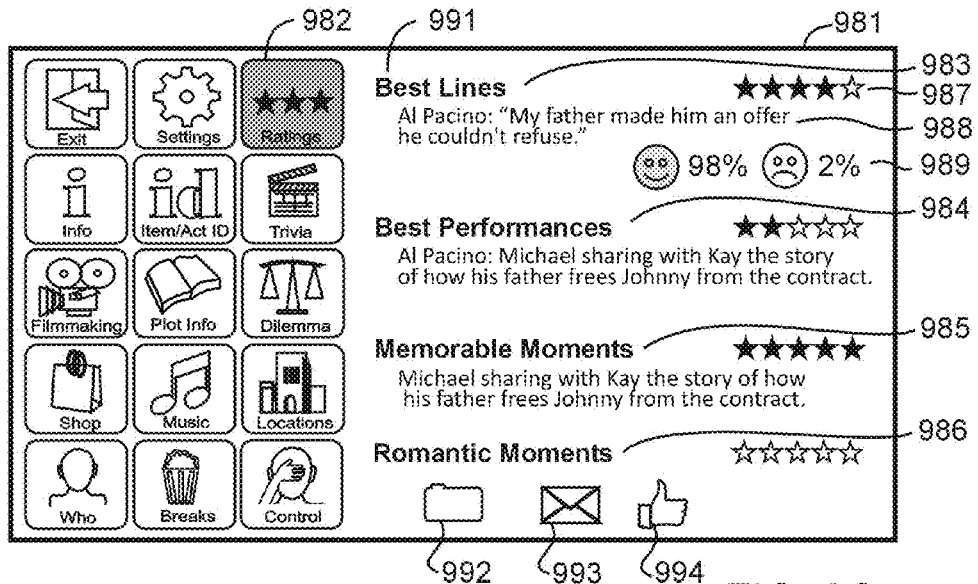
FIG. 9C is an illustration of a second screen display of features of a Ratings function.

FIG. 9C is an illustration of a second screen display of features of a Ratings function. A video map identifies noteworthy best lines, best performances, memorable moments, and romantic moments. The video map's segment definitions, descriptors (e.g., Best Lines), and descriptions (e.g., Al Pacino: "My father made him an offer he couldn't refuse.") are utilized to identify them to a user as they are played and provide the user of the opportunity to rate them (e.g., 3 stars). In one embodiment, a video map associates an image with the identification of the noteworthy lines, performances, and moments.

Generally, the image (e.g. snapshot selected from within the movie) corresponds to the item identified (e.g., a best line is associated with an image of the character delivering the line).

However, in an alternate or complementary embodiment, a display of best line is enhanced (e.g., made more entertaining) by a juxtaposition with an image used to create synergy between the best line and the image. In certain instances a best line is advantageously associated with an iconic image (e.g., a single frame of video selected from anyplace within the video) related to the subject of, and/or character delivering, the best line. A classic example of this is in movie The Godfather, the memorable line "It's a Sicilian message. It means Luca Brasi sleeps with the fishes," is associated with and displayed over an image of the fish wrapped in body armor. An iconic best line which defines a character may also be associated a displayed over an iconic image of the character that delivered the line (e.g., the line "I'll be back," is displayed with the image of the Terminator looming over the police kiosk). Still further, a humorous juxtaposition can often be created by combining a dramatic best line with an unexpected image. For example, a best line "meme" is created by overlaying a best line over an image. In those instances that a selective retrieval and playback of video is available, a line, performance, or moment may be associated with a playing of a video segment and the display may loop the video creating an animated gif. In advanced embodiments, a user is provided the routines to facilitate the selection of images and/or video, juxtapose them with an item (e.g., overlay a best line), and distribute to others (e.g. publish in social media platforms).

An exemplary second screen interface 981 includes Ratings function control 982. As in other functions, a user may activate the function at a current play position by touching the Ratings function control 982. Alternatively, a user may activate the function for the entire video by touching and momentarily holding the Ratings function control 982. When activated, the current play position is compared to the video map to retrieve and display responsive information corresponding to Best Lines 983, Best Performances 984, Memorable Moments 985, and Romantic Moments 986 being currently played. The displayed information comprises a description 988, which, in an example where a scene/clip includes a best line, the description identifies the performer of the best line and a transcript of the line. The illustrative example also indicates that the same clip may provide items in each of multiple categories. In the case of, for example, the Best Lines category, a clip may be associated with multiple entries. A multiple performers usually share, for example, a Romantic Moment.

An identified item is associated with a rating interactively assigned by the user 987. The rating may be shared with the user base at large or a circle of friends to compile a community/friends rating which may then be additionally displayed. The Ratings feature is particularly well suited for sharing and posting information (e.g., movie title, category, play time, duration, description, rating, image, and/or video clip). To that extent, and responsive to user preferences, a number of communication functions may be provided. For example, dragging a particular item to the messaging function control (e.g., email function icon 993) would enable the transmission of the information by a particular preselected communication function. Similarly, Ratings function information may be posted in various social media platforms (e.g., Facebook Like icon 994). An alternate and simplified rating system may also enabled 989 and/or user community feedback. Further, a user may save any information (e.g., the Movie title, text of a Best Line, and play position) by touching a category 991 and dragging/dropping to a folder 992 for later viewing or reference.

Search Second Screen Functions

A video map's keywords and search data enables a Search function that provides keyword search capability relating to, for example, the depiction of items, actions, performer, characters, and performer attributes, film technique, production errors, locations, best lines, and dialogue. The Search function enables the selective retrieval of segments, clips, and/or scenes responsive to a users search terms and search requests. A Search segment is 5-10 seconds, a clip is 30-60 seconds, and a scene is 2-5 minutes. Examples of keywords and search terms include: "Trinity Ducati 996" in The Matrix Reloaded; "Spider-Man kiss MJ" in Spider-Man; "cinematic wipes" in Star Wars; "Brooklyn Decker cleavage" in Battleship; and "bloody horse head" in The Godfather.

In addition to keywords and segment, clip, and scene definitions, data created for, or utilized by, the Search function also comprises, for example, key search terms, a title, an identification of a representative video frame, write-up to provide an in-video brief information about the item, a linkage to more detailed information, and identification of related map content (e.g., a Subject). For example, in the motion picture Casino Royal, the video map defines a segment by frames numbers 106739-106983. The segment, titled "Vesper Martini", relates to the character James Bond ordering a martini. The write-up to support the Search function comprises the following recipe: "The Vesper Martini: Ingredients: 3 measures of Gordon's Gin, 1 measure of vodka, ½ measure of Kina Lillet, and Lemon peel for garnish. Directions: Pour the gin, vodka and Kina Lillet into a cocktail shaker over ice and shake (don't stir!) well until ice-cold. Strain into a martini glass and add a lemon peel as a garnish. Drink it with the swagger of a certain British spy, then thwart your enemies and get the girl. All in a day's work." The video map associates the following information link: http://www.jamesbondlifestyle.com/product/vesper-martini.

A search methodology may be conceptually similar to that implemented by, for example, a Google search engine. Additionally or alternatively, a search may be facilitated by the presentation of various keyword listings that are responsive to the depicted items, actions, performer, characters, and performer attributes, film technique, production errors, locations, best lines, and dialogue. Further, a search is further enhanced by video map data structures that establish logical relationships among segments. The Video Map ¶¶0175-0196 disclosures in the '721 publication are incorporated herein by reference.

Since a search may be performed at any time, there is no obvious need to display on a primary screen an indication that a search or search information is available. However, advantageously, a video map may further identify particularly noteworthy searches to be performed. For example, the search terms "Bond order drink" retrieves three different noteworthy segments from within the motion picture Casino Royal. Thus, an indication that a search is available and recommended for a particularly noteworthy item is advantageously displayed on a primary screen and/or a secondary screen. Responsive to a user's preferences, the recommended searches automatically cause a tiles/list display of the items on a second screen.

Figure 10A:
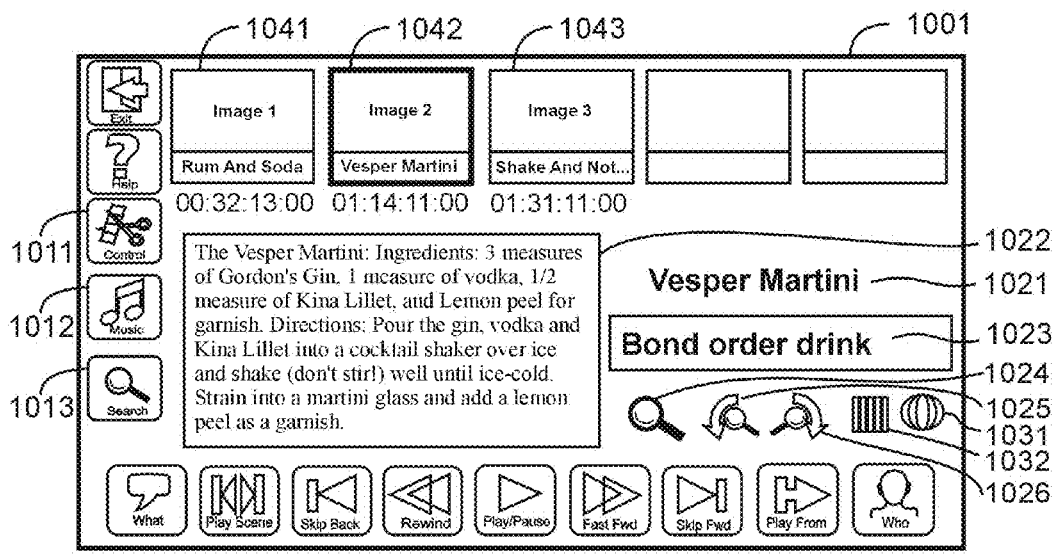
FIG. 10A is an illustration of a second screen display of features of a Search function.

FIG. 10A is an illustration of a second screen display of features of a Search function. In this particular embodiment, the user has opted to display only the function controls for which information is available at the current play location. In this example, the Control 1011, Music 1012, and Search 1013 functions are available. Responsive to preestablished user preference and the current play position, Search data is displayed on the second screen contemporaneously with the playing of the video on the primary screen. The displayed Search data comprises, for example, the title of the depiction 1021, a write up 1022, and key search terms 1023.

The Search feature interface also provides the user the capability to automatically search for depictions similarly keyworded. In this example, key search terms 1023 are automatically entered in the search bar for the user. The user may perform a search by using the Search control 1024. The search results may be displayed on the primary screen and/or in the second screen.

As is customary with second screen devices, a Search function interface also provides a QWERTY keyboard layout as generally implemented in smartphones and tablets. The keyboard facilitates the entry of search terms. In the example of FIG. 10A, key search terms 1023 are automatically entered in the search bar for the user, and may be modified by the use of the keyboard. The user may cause a search by using the Search control 1024 or alternatively a backward limited search control 1025. Responsive to the results of the search, identification of the matching segments are provided. In this example, the search resulted in the identification (e.g., title, representative image, and HH:MM:SS:FF location in the video) of multiple items (e.g., Rum And Soda 1041, Vesper Martini 1042, and Shake And Not . . . 1043).

A user may desire, during a playing of a video, to search a specific depiction relevant to the current play position that occurred prior to the current play position. This would enable replaying portion of the video of interest without being subjected to spoiler depictions. Advantageously, the Search second screen interface 1001 may also provide a backward limited search 1025 to restrict search results to the portion of the video that preceded the current play position. A backward limited search may also be referred to as a forward excluded search. If the backward limited search control 1025 is activated, then only the keyword data associated with segments that precede the current play position are searched to identify the segments/scene/clips that are responsive to the search terms. Following the playing of the depictions that result from the search function, the playing of the video is resumed at, for example, a location that is responsive to the location at which the Search function was initiated.

The search interface also includes a forward limited search 1026. If the forward limited search control 1026 is activated, then only the keyword data associated with segments that follow the current play position are searched to identify the segments/scene/clips that are responsive to the search terms. Similarly, a user is provided the means (e.g., Internet icon control 1031) to obtain external information related to the search (e.g., website page), and the means (e.g., SUB icon control 1032) to play a presentation of the plurality of video segments (i.e., a Subject) within the video relating to the currently displayed segment.

Figure 10B:
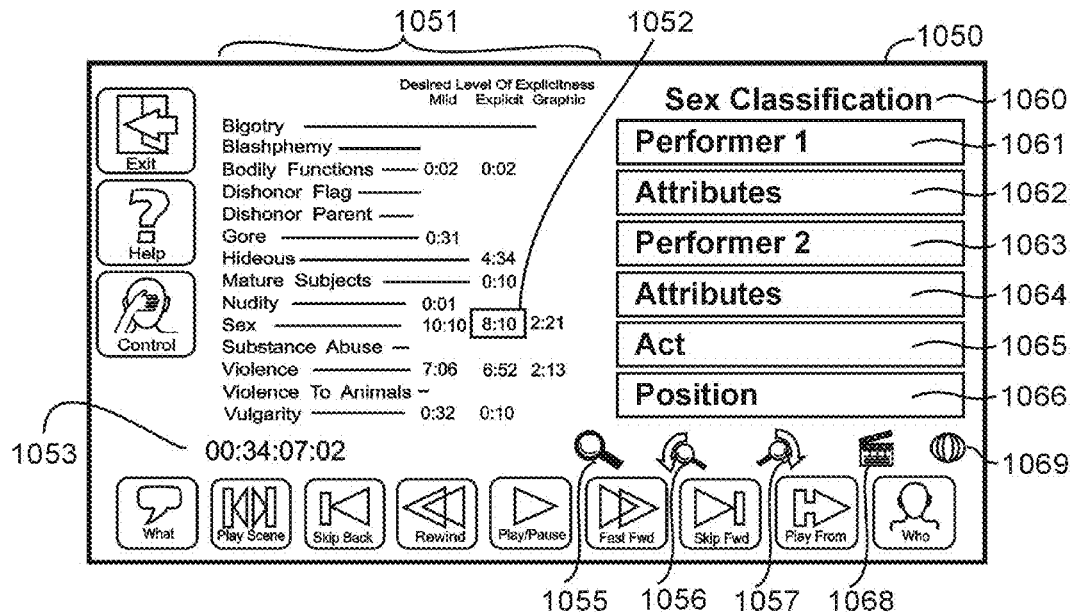
FIG. 10B is an illustration of a second screen display of features of a content-categorized Search function.

FIG. 10B is an illustration of second screen display of features of a content-categorized Search function which comprises routines that facilitate the retrieval and display of segments depicting content relating to specific performers/characters and/or content classifications. The Search function interface may as simple as an adapted version of the Control function matrix 1051 that enables selecting a category (e.g., Sex) and a level of explicitness. For example, a viewer, wishing to play the content categorized as Explicit Sex, would touch the corresponding level of explicitness control 1052 and then touch a video Search function control 1055. Such a simplified specialized Search function facilitates the retrieval and display of segments depicting, for example, sexy, sensual, erotic, and/or pornographic content.

As is the case with the Preview function search controls, the Search controls additionally include a backward limited Search function control 1056 that activates routines that restrict search results to the portion of the video that preceded the current play position 1053. If the backward limited search control 1056 is activated, then only the data associated with segments that precede the current play position are searched to identify the segments/scene/clips that are responsive to the specified search. A backward limited search during playback only retrieves and plays video clips from the selected point backwards so as to not spoil upcoming events. Following the playing of the depictions that result from the search function, the playing of the video will usually be resumed at a location that is responsive to the location at which the search function was initiated. Similarly, a forward limited Search function control 1057 activates routines that restrict search results to the portion of the video that follows the current play position 1053.

Advantageously, a specialized Search function interface utilizes a set of classification controlled dropdown menus and/or classification controlled auto-complete fields. In this particular example, the search Sex classification 1060 is associated with multiple drop-down lists and/or auto-complete fields including: a first performer 1061 and the desired physical attributes of the first performer 1062, a second performer 1063 and the desired physical attributes of the second performer 1064, an act 1065 (e.g. kissing), and the position 1066 (e.g., standing). Clearly not all fields need be completed, nor are they limited to the generalized labels. For example, the field labeled Performer 1 includes a gender entry option rather than requiring entry of a specific performer/character. Further, typical functions implemented in complex searches may be implemented (e.g., advanced Boolean searches). These advanced searches facilitate an unparallel level of discreet searches and retrieval of content for a specified combination of performer(s)/character(s)/gender 1061 1063, physical attributes 1062 1064, acts 1065, and/or positions 1066.

Advantageously, a user is also provided an external search function (e.g., search other motion pictures 1068 stored locally or remotely, and an Internet icon control 1069) to conduct an automated external search of the search terms entered in the various controlled drop-down lists and/or auto-complete fields. The search results may be displayed on the primary screen and/or in the second screen.

Data created for, or utilized by, the specialized Search function comprises, for example: segment definitions; identification of the performers/characters; and lists of keywords for a noteworthy attributes, clothing, actions, and positions within a segment of the video. Examples of Preview function data include: in the movie 300 Rise of an Empire, a segment defines by frames 80165-80290 and descriptors "Eva Green as Artemisia naked topless large natural breasts"; and in the movie Captain America: The Winter Soldier at a segment defines by frames 2013-2104 and descriptors "Chris Evans as Steve Rogers large chest muscles pectorals pecs tight Under Armour V neck fitted shirt".

Information Display Modes

Generally, it is advantageous that a user be provided the option to determine the orientation of the second screen, and the inclusion and layout of the individual feature elements, controls, and/or sets of controls as the user may deem advantageous from time to time. The illustrations provide some of a nearly infinite number of possible configurations, inclusion of elements, notifications, functions, and the display of information. Advantageously, a user is provided a range of information display modes for which the user may preestablish global and/or function specific preferences. Still further, taking advantage of the optical capabilities of a second screen, the brightness and backgrounds colors of the second screen interface may be automatically adjusted to complement the general/ambient lighting, and, when the lighting permits, the dominant colors of the video being played on the primary screen.

An information display mode may be as simple as the display of text and/or an icon that awakens a second screen from sleep mode while maintaining a no noise and low light condition. In that mode, while the video is playing on the primary screen, the second screen, while the second screen information is executing in the background, the display is in a sleep state. When a notification event is encountered, a notifying message and/or icon are displayed. Sliding the text or touching the icon launches function routines that provide responsive information.

Others exemplary embodiments, illustrate more complex configurations comprising multiple notification icons, each with behaviors and information responsive to the respective information functions and synchronization parameters. An information active function control may be highlighted. Others may display functional information (e.g., Dilemma notification countdown clock), and others may toggle on and off responsive to the availability of information (e.g., Who function control).

Figure 11A:
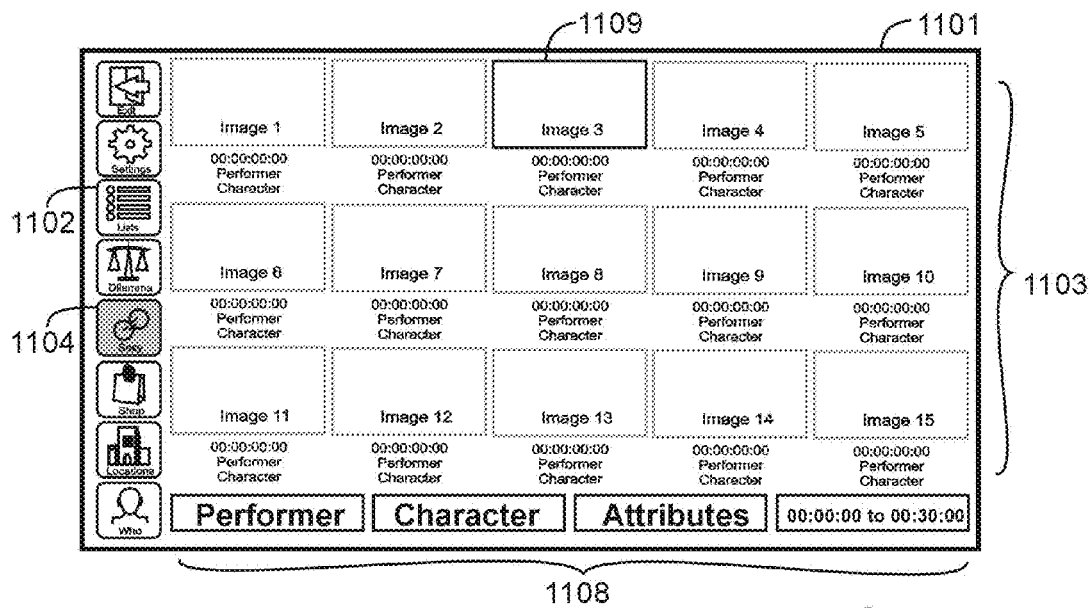
FIG. 11A is an illustration of a second screen display of features of a function in a tiles mode.

An information display mode may also take the form of a display of multiple icons and information tiles. The display of tiles in a strip and other configurations is well developed in second screen applications. FIG. 11A is an illustration of a second screen display of features of a function in a tiles mode. In this interface example 1101, a Lists/Tiles function control 1102 provides access the various features in a list or tiles modes. The Lists/Tile functions may be accessed prior to, during, and/or following the playing of the video. Once activated, toggling the Lists/Tiles function control 1102 switches the display from the depicted tiles mode 1103 to a list mode. In this instance, the displayed icon and descriptor 1102 is the reverse of the active function. In this particular illustration, a user has activated, in a tiles mode, the Sexy function control 1104 which facilitates the retrieval and display of images/video depicting sexy, sensual, erotic, and/or pornographic content.

In this exemplary embodiment, a user is also provided the capabilities to specify and/or limit/filter the display of information (e.g., Image 1105, Performer/Character Name 1106, and video play position identifier such as time code 1107) responsive to the user's preferences 1108 (e.g., Performer, Character, Attributes, and approximate or range play positions HH:MM:SS). Additionally, or alternatively, the Performer/Character Name 1106, and video play position identifier such as time code 1107 are displayed in the selection boxes 1108 as a particular title is highlighted 1109.

Figure 11B:
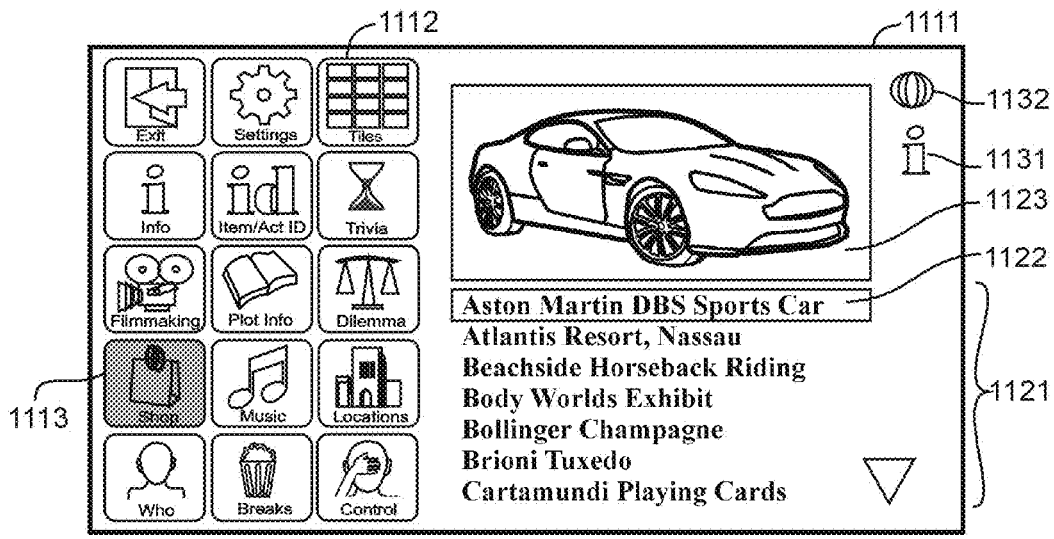
FIG. 11B is an illustration of a second screen display of features of a function in a list mode.

FIG. 11B is an illustration of a second screen display of features of a function in a list mode. A List second screen interface 1111 enables a user to access the information available for the various second screen functions in a list display mode. In this particular example, a user has elected, by pressing the Shop function control 1113, to cause the display of a list of the items 1121 associated with the Shopping second screen function. The currently highlighted Shopping item 1122 is associated with an image 1123 of the item, with additional internal information 1131 (e.g., information provided by the video map such as the time code of the segment depicting the highlighted item), and with additional external information 1132 (e.g., website page). A user may toggle to a tile mode by activating the Tiles/List function control 1112.

By contrast to the simple information display mode comprising the display of text and/or an icon that awakens a second screen, A far richer and more active information mode would cause a continuous display of detail information responsive to the various user function preferences. For example, the set of geographical maps may be automatically retrieved and displayed on the second screen as the video continues to be played on the primary screen. As was previously detailed, this information display mode, advantageously includes context sensitive controls that also serve to identify the availability of information that is responsive to the play location. In this example, responsive to what is depicted in the movie the context sensitive controls include, for example, a Shop control, a Locations control, and a Filmmaking control.

Multi-User Embodiments

The communication capabilities of second screen devices may be utilized to further realize the potential of the second screen in-video functions. A second screen display of integrated video playback and in-video functions may be transmitted and played on the primary screen by the use of a number of devices. For example, Google's Chromecast is a thumb-sized media streaming device that plugs into the HDMI port on the primary screen (e.g., television). A user may utilize, for example, a smartphone, tablet, laptop, to transmit entertainment and applications to the primary screen. (See, for example, http://en.wikipedia.org/wiki/Chromecast) Advantageously, mirroring the second screen display provides others the available options while retaining the advantages of using the second screen to navigate. The Apple AirPlay Mirroring implementation enables a user to mirror content from a user's iPhone, iPad, or iPod touch to the user's HDTV via an Apple TV device. (See, for example, http://en.wikipedia.org/wiki/AirPlay) The teachings of Google's Chromecast and Apple's AirDrop and AirPlay are incorporated herein by reference. Thus, with the capability of casting/mirroring the second screen content, a user may share second screen content with others viewing the primary screen and/or using other second screen devices.

Further, the communication capabilities of second screen devices and second screen functions may be advantageously utilized in a multi-user multi-second screens embodiments. For, example, a first user and a second user remote from each other are concurrently viewing the same motion picture on their primary screen and each has enabled the individual in-video function of general interest. A first user may activate the Info function on his/her second screen, while the remote second user may activate the Locations and Music functions on his/her second screen. In this example, the first user following reading a Info write-up may deem desirable to share that information with the second user. With that object, the two second screen devices may have preestablished or establish a continuous, nearly continuous, intermittent, or temporary communication linkage to share second screen information.

Many technologies may be implemented to establish such communications, such as local area wireless technology (e.g., Wi-Fi) as in the case of close proximity, and communications networks (e.g., the internet). Further, the transmission of information between the second screen devices may be facilitated by a services provider that provides map processing and/or the in-video information to the users. For example, an in-video information provider may be providing the Info function information to the first user's second screen, and the Locations and Music functions to the second user's second screen. In this instance the first user causes the transmittal of a request to the services provider to provide the Info write-up to the second screen of the second user.

Figure 11C:
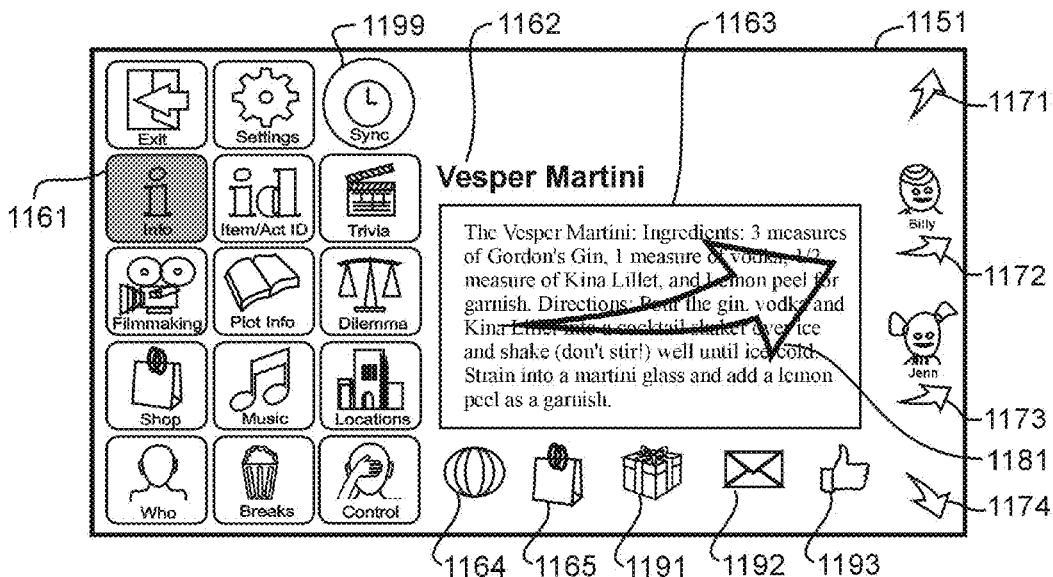
FIG. 11C is an illustration of a use of a touch screen to define specific casting/mirroring of second screen content.

FIG. 11C is an illustration of a use of a touch screen to define specific casting/mirroring of second screen content. The previously incorporated U.S. patent publication 20130007793 discloses: "A method and system for generating a dynamic user interface on a second screen control device for controlling the content being displayed on primary viewing screen." The disclosure is one example of underlying touch screen technologies that are incorporated herein into a multi-user multi-second screens embodiments.

FIG. 11C depicts an instance in a second screen 1151 where a first user has enabled the Info second screen function 1161. In this example, during a playing of the motion picture Casino Royal, an Info function information for the Vesper Martini depiction provides a title 1162, a recipe write-up 1163, and an external link 1164 to additional information. A review later function control 1165 enables the user to save the item for later review and/or the previously disclosed Shopping function.

In the example of FIG. 11C, two complementary and/or alternative "casting/mirroring" methodologies are implemented. First, the interface provides a set of arrows each associated with a specific transmission function. The up arrow 1171 when touched causes the Info function title 1162 and write-up 1163 to be casted/mirrored to the primary screen. The down arrow 1174 when touched causes the Info function title 1162, write-up 1163, and link 1164 to be saved to a user specified file, memory, device, and/or location. In this instance, two right arrows enables sending the Info function title 1162, write-up 1163, and link 1164 to a second screen of either one of both of two users, each associated with an image/icon and name/handle/avatar. User "Billy" being in the same room as the user, and user "Jenn" being remotely located from the user.

The second methodology, directionally similar to the first, enables the user to cause the activation of the individual transmission functions by swiping 1181 the desired specific content, (e.g., the write-up 1163) or, by for example, swiping an all function control 1191 (e.g., gift box icon) which would transmit the Info function title 1162, write-up 1163, and link 1164. As in the arrow implementation, a directional swiping (e.g., up, down, left, right, and angled) directs the information to a specific destination. Touching a messaging function control (e.g., email function icon 1192) would enable the transmission of the information by a particular preselected function. Similarly, icons for the various social media platforms (e.g., Facebook Like icon 1193) may be implemented to enable the user to automatically post content. Two fingers swiping towards the right may be associated with either sending all the information or sending the particular information to all other users. As everywhere else herein, user preestablished preferences may define what specific content may be transmitted to which users. Further, the entire second screen experience of a user may be mirrored on the primary or second screen of another user.

In those embodiments relying in an acoustic fingerprint synchronization methodology, it may be advantageous to provide a Sync function control 1199 that when activated by the user would activate the appropriate acoustic fingerprint synchronization routines.

Second Screen Embodiments

Second screen embodiments may be broadly categorized as comprising either: (i) item notification displayed together with video playback on the primary screen that is software synchronized with information displayed on a second screen; (ii) video playback on a primary screen that is software synchronized with information displayed on a second screen; (iii) video playback on a primary screen that is user synchronized with information displayed on a second screen; or (iv) video playback on a primary screen that is not synchronized with information displayed on a second screen.

Figure 12:
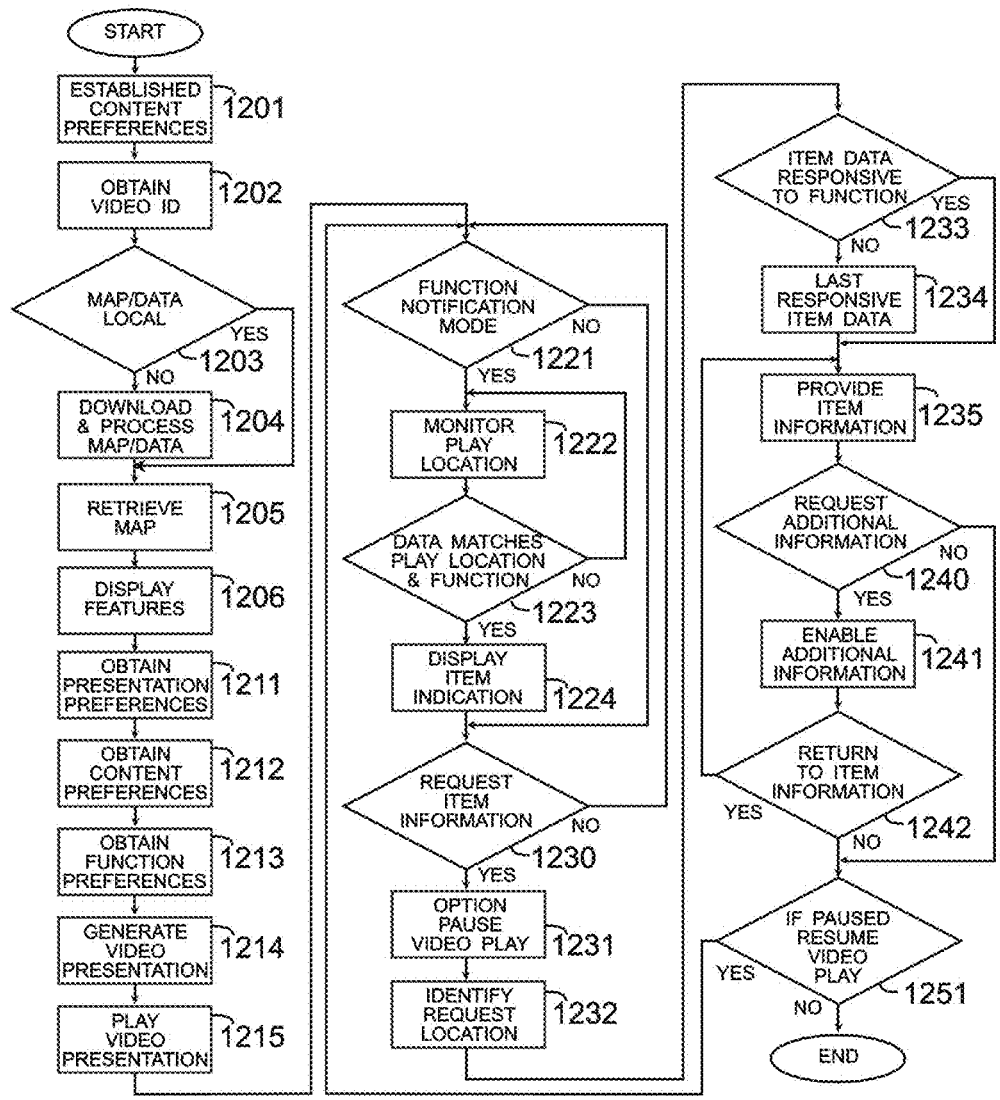
FIG. 12 is a flow chart of a method for displaying second screen information synchronized with video and notification display on a primary screen.

FIG. 12 is a flow chart of a method for displaying second screen information synchronized with video and notification display on a primary screen. This particular embodiment is dependent on a set of software applications that are capable of superimposing content on the video displayed on the primary screen, and capable of communicating synchronizing information from the primary screen to a secondary screen in order to synchronize the display, on the second screen, of responsive information and content.

In an exemplary embodiment, the hardware platform comprises a personal computer retrieving video from a streaming video service provider (e.g., Google streamed video) and displaying the video on a primary screen. Software routines in the personal computer obtain synchronizing information (e.g., timing information such a current location time code) from the video as the video is played. The software application comprises routines that have access to video playback functions that provide the required synchronizing information (e.g., time code feedback). For example, in a PC embodiment playing a Google streamed video, the getCurrentTime function returns the time code of the current play position. Similar time code retrieval functionality is available with the Microsoft Media Player, and most software media players.

The video map, information and content related to a corresponding video, play routines specific to the video, and control codes for automatically configuring or controlling the functions of the end-user devices may be downloaded, processed, and/or queried at a device/primary screen, and/or downloaded, processed, and/or queried at a second screen device (e.g., a tablet). Responsive to the utilization of the video map, the information and content displayed on the second screen may be retrieved by another device (e.g., PC) from the video map or an external source (e.g., remote server) and provided to the second screen, and/or directly obtained by the second screen from the video map or an external source. With respect to a playing of a video, the Video Map ¶¶0063-0076, Bookmark Generating Data ¶¶0105-0114, Seek/Step Data ¶¶0115-0148, Map Synchronization ¶¶0149-0188, and the Multi-Navigators ¶¶0189-0208 disclosures of U.S. patent publication 20140219630 are incorporated herein by reference.

Referring to FIG. 12, typically, a user would have preestablished content preferences 1201 prior to playing a video. Following user selection of a video or a plurality of videos, the video ID(s) are obtained 1202 to determine if a map and other data is available for the video(s) 1203. If a map is not locally available 1203, or if updating of maps is automatically performed at this point, then the map is downloaded from a remote source and processed 1204 (e.g., merged with local user database and/or updating). If a map is locally available 1203 or following download 1204, the map is retrieved 1205 to display the available features 1206. The user's presentation preference is obtained 1211, and content preferences if not previously obtained are obtained 1212. The presentation preference and content preferences are applied to the video map to generate a video presentation 1214 (e.g., a playlist of segment definitions defining video segments from within the video). If video playback function preferences were preestablished, the user's function preferences are obtained 1213 and the video presentation is played 1215. A user's function preferences (e.g., second screen function displays) may be preestablished, established, and/or modified at any time (e.g., contemporaneously with preestablishing content preferences, prior to playing a video, prior to playing a feature, and during the playing of a presentation).

If item notification routines have been activated 1221 in notification mode and/or second screen mode, then the current play location within a video 1222 is identified. Once a play location is identified, the item data is queried (e.g., a plurality of segment definitions are searched) to identify segment definitions that are responsive to the play location and the particular function(s) activated 1223. If no segment definition is responsive, then the play location is continued to be monitored 1222. If a segment definition is responsive 1223, an indication that item information is available for an item being depicted is displayed and/or the second screen displays are activated 1224. If a request is not received from a user for item information 1230 in response to the display of an indication that item information is available 1224, then, if the function notification mode is still activated 1221, the play location is continued to be monitored 1222.

In an exemplary embodiment, if a user has activated one or more of the in-video functions (e.g., Who, Locations, Plot Info, and Filmmaking) in notification mode, then, during the playing of a video, an indication is displayed that item information is available for an item being currently depicted with respect to one or more categories of content of interest to the viewer. The indication that item information is available may be displayed on the primary screen and/or the second screen as previously detailed. Item notification offer a number of advantages including, for example, a better match between a request for item information for a particular item being depicted and the availability of corresponding item information on a second screen. To some users, the item notification enhancements disclosed herein offer a better user experience with obtaining item information for an item being depicted in one or more of a plurality of informative and entertaining playback functions. Nonetheless, some in-video functions do not require notification on a primary screen, or a user may not desire the display of notifications on the primary screen. Thus, advantageously, item notification on the second screen provides an unobtrusive methodology.

If a request is received from a user for item information 1230 in response to the display of an indication that item information is available 1224, then the playing of the video is automatically paused 1231 if not already paused. A user may request item information by, for example, tapping a corresponding function control on the second screen. In those instances where the second screen comprises remote control functionality, double tapping function control on the second screen will also automatically pause the playing of the video on the primary screen. Alternatively, the pausing of the video 1231 may be optional as a user may desire that the video continue playing while the item identification routines dynamically respond to changes in the current play location. A user may prefer to obtain contemporaneously updated frame accurate item information as the video continues to be played. In such cases, user preference would disable the routines from automatically pausing a playing of the video. In the case of, for example, the Who function, where item notification on the primary screen is unnecessary or not desired, item information (e.g. performer/character identification) may be contemporaneously displayed on the second screen as the video continues to be played on the primary screen.

In a second screen application, a user is likely to utilize the capabilities of the second screen to request item information. For example, pressing an item information control button/object in the second screen user interface would be received, during a playing of a video, as a request from a user for item information relating to an item depicted within the video. For example, as detailed with respect to the Locations function, pressing the Locations button/object causes the activation of the display of Locations information notification routines, and, when available, the display of locale item information. If locale item information is not available for the current play position, notification may provide a time to the next instance of responsive Locations function information.

In the case of, for example, the Who function, where item notification on the second screen is unnecessary or not desired, item information (e.g. performer/character identification) may be contemporaneously displayed on the second screen as the video continues to be played on the primary screen. Nonetheless, the Who function information may also include, for each of the currently depicted characters. a countdown timer to the next clip in which the character is present or the depiction of the character is noteworthy.

In a second screen application, a user is likely to utilize the capabilities of the second screen to request item information. For example, pressing an item information play control button/object in the second screen user interface would be received, during a playing of a video, as a request from a user for item information relating to an item depicted within the video. For example, as detailed with respect to the Locations function, pressing the Locations button/object causes the activation of the display of Locations information routines, and the display, when available of locale item information.

Following the request for item information 1230, a request location (e.g., time code, frame identifier, or some other indicator of the place or location, within the video that is currently being played) is identified 1232 that is responsive to the request for item information. A location within the video may be identified by a variety of means including, for example, time codes in a seconds and milliseconds format or an HH:MM:SS:FF (Hours, Minutes, Seconds, and Frames) format, frame identifiers, bit positions, logical positions identifiers, or any format or other indicator that can consistently accurately identify a location in a video. A location may also be referred to as a position or place. In a multi-video embodiment, the identification of the video being currently played is particularly material in those situations where the presentation comprises the playing of segments retrieved from within a plurality of videos. The video may be identified by any of a number of methodologies being currently practiced or known in the art.

Dependent on the particular embodiment, to allow for delays by the user to request item information, the identification of the request location 1232 may be responsive to a preestablished delay adjustment preference, such as, a user's specific previously defined amount of time, e.g. 10 seconds. Herein, whether a user's preference or a system's preference preestablished means that the amount is not dependent on a user's action at the time of the request. Preestablished does not necessarily mean that the preference is not responsive to the particular segment being played. In those instances that the playing of the video is voice controlled, separate default values may be established to accommodate the fact that user may be more likely to say "where" or "why" faster than to be able to press a button on a remote control specially while viewing a full length motion picture. To facilitate voice response audio commands may be adopted such as "cpwho", "cpwhat", "cpplotinfo", and "cpinfo". Alternatively, a user may teach the player a user preferred set of voice commands. In one embodiment, rather than a user configuring the system at the time of installation or a first playing, autoactive software routines would learn the user's preferences from the user's actions or commands, and adjust the various settings accordingly.

Once a request location 1232 is identified, the item data is queried (e.g., a plurality of segment definitions are searched) to identify segment definitions that are responsive to the request location and the playback functions that are activated 1233. A segment definition is responsive when it includes the request location, as may be adjusted, within the beginning and ending of the defined segment and is associated with information that is responsive to an activated function. A request location, as may be adjusted, matching either the beginning point, the ending point, or any point in between is deemed to be within the beginning and ending. In one embodiment, identifying a segment definition that is responsive comprises, for example, comparing the time code of the request location and finding a segment definition having a beginning time code that is the same or earlier than the time code of the request location, and having an ending time code that is the same or later than the time code of the request location.

If a responsive segment definition is found 1233, then item information associated with a responsive segment definition is provided 1235 (e.g., displayed, played, and/or retrieved). To accommodate those situations, in which at the time that the user has requested item information, a segment definition is not responsive, the request location may be adjusted to include the request location and a predetermined play period prior to the request location, for example, 30 seconds. In this fashion, a segment definition may be responsive to the information request or a predetermined play period prior to the request location. In determining if a segment is responsive to the request location or a predetermined play period prior to the request location, the segment definition maybe adjusted and/or the request location/period may be adjusted. Advantageously, this method enables the retrieval and display of item information associated with a number of recently played depictions of items having item information available. The item identifying information, such as an item image and descriptors, that are retrieved and displayed enable identification by the user.

Item information may have been already retrieved and loaded into processing memory, and, thus, retrieval is from the memory. Alternatively, the item information is retrieved from any of a variety of storage memories, local devices, or remote locations as needed. Herein, the term "retrieve" should be understood in the broadest sense and comprises obtain, acquire, procure, download, transfer, extract, and to come into possession by any means or methodology from a local and/or remote source.

If, for example, a user requests item information for an item that was no longer being depicted, a segment definition may not be found that is responsive to the request location 1233. In such situations, a proper message is displayed (e.g., item information not available for this location). Alternatively, a number of methodologies may be implemented to provide item information 1235 for a most recently depicted item for which item information is available 1234. For example, segment definitions are searched to identify a segment definition that has an ending point prior to and closest to, within certain parameters, the request location.

If a user requests additional item information 1240 relating to displayed item information, then the display of additional item information is enabled 1241 in response to the request for additional item information. It is understood that the retrieval, providing, and displaying of additional item information may be subject to the control of a third party provider or a source not within the control of the user's apparatus. The term herein "enabling a display" does not guarantee or require that in fact additional item information is retrieved, provided and/or displayed. For example, item information may be linked to a remote source that customarily provides additional item information but the source is not accessible at the particular time of the user request for additional item information. Such situations still satisfy the "enabling a display". Additional item information comprises, for example, information specific to the purchasing of the item, a transfer to a website's one click page, content previously downloaded, and content retrieved from within the video or from within a plurality of videos. For example, additional item information may provide depiction of the item extracted from a full-length movie franchise.

A user may request additional item information using a variety of technologies and methodologies. For example, clicking or pressing an item information play control button/object in an user interface on the second screen would be received, during the display of item information, as a request from a user for additional item information relating to a single item for which item information is displayed. Where item information is displayed for multiple items, selection of a desired one of the displayed item information would be required in connection with, for example, the clicking or pressing of an item information play control button/object on the second screen. For example, the displayed item information previously detailed each constitute a button/object associated with a "clickable" event that when activated or selected by the user would constitute an additional item information request.

The display of multiple item information may be limited to a system or user preestablished number of the last depicted items prior to the request for item information. In an exemplary embodiment up to five item information are displayed for items that were depicted within 30 seconds of the item information request, with the most recently depicted item being displayed to the right of the others.

Termination of the display of additional item information 1242 returns to the screen/menu providing multiple item information 1235 rather than automatically resume video play 1251. This would be particularly advantageous where multiple item information is displayed. Alternatively, termination of the display of additional item information 1251 automatically resumes video play if previously paused. A termination of the display of additional item information may take many forms, such as exiting the additional information function (e.g. exiting a website, and exit or escape request). Any terminating event that indicates that the user desires to resume video play may be considered a video play request.

If a user does not request additional item information relating to displayed item information 1240, then a resume video play request is monitored and if received 1251, display of the item information is terminated and play of the video is resumed responsive to the item information request location. At this point, unless terminated by another process, the item identification routines, subject to the function notification mode 1221, restart at the appropriate one of the monitoring of a play location 1222 or monitoring of a request for item information 1230. If the resume video playback is terminated 1251, the process may end, or restart at any suitable point (e.g., display feature 1206, or obtain video ID 1202) responsive to the terminating action (e.g., a new video is detected).

When the user elects to exit the additional information environment, e.g., a page in a website, the playing of the video may be automatically resumed at a location that is responsive to the request location. Resuming a playing of the video responsive to the request location following a termination of a displaying of additional item information does not require resuming a playing of the video at the exact location at which the request for item information was received. The resumption location may be additionally responsive to other considerations including, for example, technical limitations. In an exemplary embodiment, rather than resuming a playing of the video at a location that is responsive to the request location, a playing of the video is resumed at a location that is also responsive to one or more determinants, such as, the amount of time that the playing of the video has been paused, the beginning or ending of the segment depicting the item, and/or a beginning of a clip or scene. The suitable location for resuming the playing of the video may be directly identified by a segment definition that is responsive to the request location. Further, the automatic resuming of the playing of the video may itself be responsive to the number of item for which item information is displayed. For example, if item information is displayed for multiple items, then the playing of the video would not be resumed following a termination of a displaying of additional item information. Thus, resuming a playing of the video at a location that is responsive to the request location is not limited to resuming a playing of the video at the request location.

Advantageously, an information mode may be selected by the user that automatically pauses the playing of the video and provides responsive information consistent with the enabled playback function as the presentation is played. To accommodate such a mode the map may further associate with the segment definition a time deemed adequate for the playback to be paused and automatically resumed. Alternatively, the resumption of the playback would be responsive to a user playback resumption request. Still further, since many of the presentations in the Presentation feature fall within certain standardized categories, a user may preestablish combinations of categories of presentation (e.g., Intellectual) with one or more playback functions (e.g., Filmmaking and Plot Info).

The flow chart of FIG. 12 has been intentionally drafted to disclose a number of possible embodiments. A number of permutations, combinations, substitutions, and/or additions in the specific steps, and recursive functions may be initiated at different points in the process than those illustrated. In an exemplary second screen embodiment, the item indication 1224, item information 1235, and/or additional item information 1241, elements of in-video functions are displayed on the second screen. Further, the playing of the video may or may not be paused responsive to the particular primary and second screen hardware platform, the particular in-video functions that are active, and user function-specific preferences.

Further, the detailed disclosure herein offer additional elements that may be synergistically, additionally or alternatively, implemented in one of many possible second screen embodiments. The inventions are not limited to any particular embodiment. Many combinations of the various elements are possible to fit each of a multitude of situations. In an exemplary embodiment a video map comprises, for example, the information to support a user's version preferences, presentation preferences (e.g., Presentations, Compilations, Subjects, Dilemmas, Best Of, Performers, Shopping, Music, Search, and Preview), content preferences, in-video preferences (e.g., Locations function), and playback functions (e.g., What function). Accordingly, a second screen embodiment that is software integrated and synchronized with a primary screen display performs the steps consistent with such a full featured video map.

Clearly, a most preferred embodiment is not limited to the simplified embodiment illustrated above. FIG. 12 details some of the extensive functionality that is provided by the multiple playback functions previously detailed. Further, while the content preference and presentation preference steps precede the playback functions in FIG. 12 as would be the case in some situations, it is not always the case. For example, as previously indicated, an adjustment of content preferences may take place at any time during video playback.

A combination of a presentation preference and a function preference is particularly advantageous in providing a highly customized and enhanced movie experience for, specially, a narrowly targeted audience. For example, the combination of an "Intellectual" presentation that focuses on the plot points of a movie (e.g., Cloud Atlas) together with the Plot Info function enabled on a second screen offers material advantages to the user that desires to focus on the intellectual aspects of the movie rather than on, for example, the action clips. The enablement of the Plot Info function provides the additional intellectual insight that that user would prefer.

An example of a highly tailored second screen embodiment is the "X-Men Movies Cerebro App" which claims to permit a user to: "Experience the X-Men: Days Of Future Past on Second Screen". The application syncs the playing, on a Blu-ray player, of the Blu-ray release of the motion picture X-Men: Days Of Future Past to a user's tablet or smartphone. The application also enables a user to "Flick Movie Extras" from the user's device to the TV screen. To set-up the application, the user is required to: Download the X-Men Movies Cerebro App to the second screen device; Start the movie on the Blu-ray player; and Sync the app to the movie via Wi-Fi or manual connection. To access the additional extras the user is instructed to "tap the blue dot in the center 3 times on the main menu of the X-Men Movies Cerebro App." While the Cerebro App is limited in terms of the second screen functions it provides, the application's foundational routines, methodologies, and software technologies, including automated and manual synchronization of the second screen with video playback on the primary screen, are incorporated herein by reference and may be implemented in various embodiments disclosed herein.

Figure 13:
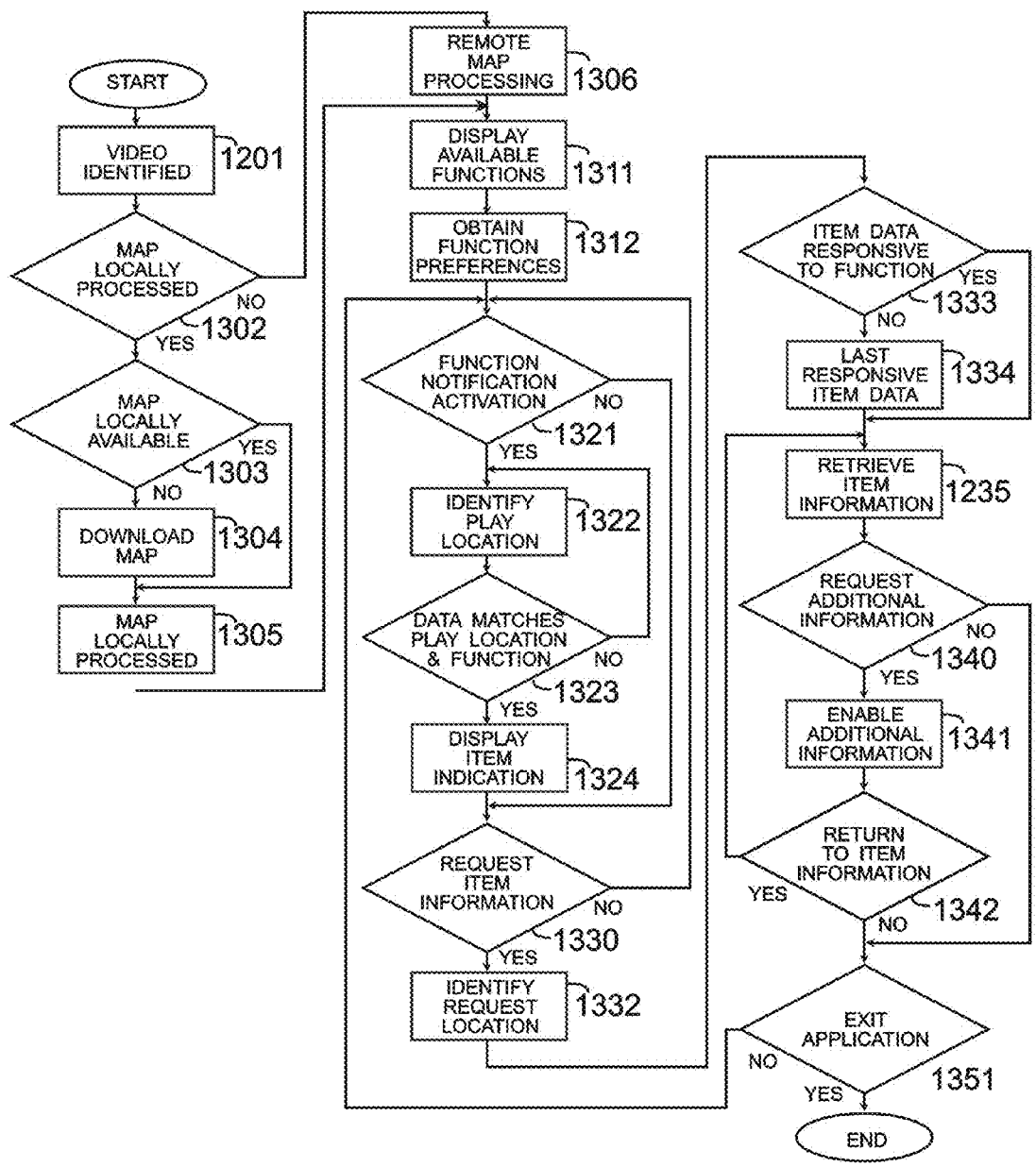
FIG. 13 is a flow chart of a method for displaying second screen information synchronized with video display on a primary screen.

FIG. 13 is a flow chart of a method for displaying second screen information synchronized with video display on a primary screen. This particular exemplary embodiment is dependent on a software application that is capable of synchronizing the display of information to a video playing on a primary screen. This exemplary embodiment is not limited to any particular device playing the video, the source of the video, or an application directly or indirectly accessing the video. Rather this embodiment relies on a software application residing in the second screen that is capable of synchronizing the display of information on the second screen to the playing of a video on a primary screen.

Referring to FIG. 13, typically, a following selection of a video, a user identifies the video being played to the software application running on the second screen. Alternatively, the video being played is identified by a methodology similar to how the Shazam mobile application identifies songs. The Shazam website explains that when a user desires to identify an audible musical item, the user starts the Shazam application and taps the Shazam button. The Shazam identification routines relies on creating a digital fingerprint of the audio being played and comparing it against a database of digital fingerprints associated with information about musical items. Upon a match, the user is provided an identification of the musical item and other related information including purchase information. When suitable lyrics are available, the Shazam application is capable of synchronizing the lyrics to the musical track, providing the user the potential for a Karaoke like experience.

In an exemplary embodiment, as the video is played, the second screen application obtains sufficient instances of a representation (e.g., acoustic fingerprint, digital fingerprint, or audio signature) of the audio to be able to identify, within a certain time, the video being played 1301. With respect to identifying a particular release of a video in order to retrieve and apply the appropriate video map, and modifying, responsive to the particular release of a video, a video map's segment definitions, seek/step data, and/or bookmark generating data, the Video Maps Responsive to Video Releases ¶¶0269-0284 disclosures of U.S. patent publication 20140219630 are additionally incorporated herein by reference. If the video is not identified, an appropriate message seeking user input may be provided.

In those embodiments, where the video map is processed by the second screen 1302, once the video is identified 1301, a search of the available video maps is performed 1303 to determine if a video map for the identified video is currently stored in the second screen. If a map is not locally available 1303, or if updating of maps is automatically performed at this point, then the map is downloaded from a remote source 1304 and processed 1305 (e.g., merged with local user database and/or updating). If a map is locally available 1303 or following download 1304, the map is locally processed 1305 to display the available second screen functions 1311. If a map is not locally processed 1302, then the map is processed by another device or remotely processed 1306 in order to communicate to, and display the available functions on, the second screen 1311.

A user's second screen preferences may be preestablished, established, and/or modified at any time (e.g., prior to or during a playing of the video). The function preferences are obtained 1312 to determine if any second screen notifications are to be activated 1321.

If second screen notification routines have been activated 1321 in notification mode and/or second screen mode, then the current play location within a video 1322 is identified. Once a play location is identified, the item data is queried (e.g., a plurality of segment definitions are searched) to identify segment definitions that are responsive to the play location and the particular second screen notification(s) are activated 1323. If no segment definition is responsive, then the play location is continued to be monitored 1322. If a segment definition is responsive 1323, an indication that item information is available is displayed and/or the second screen information displays are activated 1324. If a request is not received from a user for item information 1330 in response to the display of an indication that item information is available 1324, then, if the function notification mode is still activated 1321, the current play position is continued to be monitored 1322.

In an embodiment that does not provide direct current play position identification, a number of methodologies may be implemented to otherwise synchronize second screen functionality with a playing of a video on a primary screen. Generally, with respect to second screen systems and methods, and specifically, with respect to the apparatus, systems, architectures, methods, and functionalities for synchronizing the display of information on a second screen to a playing of a video on a primary screen, the following disclosures are incorporated herein by reference: U.S. Pat. No. 8,150,165 titled "System And Method For Visual Recognition"; U.S. Pat. No. 8,374,387 titled "Video Entity Recognition In Compressed Digital Video Streams"; U.S. Pat. No. 8,516,528 titled "Synchronization Of 2nd Screen Applications"; U.S. Pat. No. 8,516,533 titled "Second Screen Methods And Arrangements"; U.S. patent application 20110289532 titled "System And Method For Interactive Second Screen"; U.S. patent application 20090327894 titled "Systems And Methods For Remote Control Of Interactive Video"; U.S. patent application 20130111514 titled "Second Screen Interactive Platform"; and U.S. patent application 20140071342 titled "Second Screen Content". Further, currently available open source applications, such as Echonest, provide source code for the implementation of acoustic fingerprint synchronization.

In a methodology similar to a video identification 1301, a current play position may be identified 1322 by continuously and/or intermittingly matching audio samples (e.g., an acoustic signature) to a database of acoustic data to retain video map synchronization with the playing of the video on the primary screen. "An acoustic fingerprint is a condensed digital summary, deterministically generated from an audio signal, that can be used to identify an audio sample or quickly locate similar items in an audio database." (Source: Wikipedia acoustic fingerprint)

Intermittent samples of audio (e.g., once every minute or approximately a total of 100 samples in an average motion picture) may be supplemented by maintaining an expected play clock during the sampling interval. Advantageously, the methodology may reduce the amount of acoustic signature data in the video map while still providing an effective identification of a current play position within the necessary precision tolerances. Further, the methodology enables materially reducing the frequency of audio sampling responsive to the second screen functions that are activated and user actions. For example, if a user has only enabled the Plot Info second screen function, which averages 15 instances, maintaining video map and video playback synchronization may only require matching 20-25 audio samples.

In an acoustic fingerprint embodiment, a second screen device receiving synchronizing information that is responsive to a video playing on a primary screen device may comprise, for example, the second screen device's microphone capabilities receiving (e.g., listening to) an audio that is provided by a playing of the video, and any ambient, background, atmospheric audio, sounds, and noises that are present. Thus, synchronizing information that is responsive to a video playing on a primary screen device may also be responsive to other audio, sounds, and noises that are present. Within the confines of a household, the generation of an acoustic fingerprint and the matching to a database to determine a current play position readily compensates for extraneous sounds and noises. As a backup, a second screen device receiving synchronizing information comprises a user manually inputting synchronizing information into the second screen device.

In an exemplary embodiment, if a user has activated one or more of the in-video functions (e.g., Who, Locations, Plot Info, and Filmmaking) in notification mode, then, during the playing of a video, an indication is displayed 1324 that item information is available for an item being currently depicted with respect to one or more categories of content of interest to the viewer. Item notification offer a number of advantages including, for example, a better match between a request for item information for a particular item being depicted and the availability of corresponding item information on a second screen. To some users, the item notification enhancements disclosed herein offer a better user experience with obtaining item information for an item being depicted. Nonetheless, some in-video functions do not require notification on a second screen, or a user may not desire the display of notifications on the second screen. In this particular second screen embodiment, item indication 1324 may additionally or alternatively comprise and audio notification, vibration, and/or increase brightness of the second screen or portion of the second screen.

If a request is received from a user for item information 1330 in response to the display of an indication that item information is available 1324, the request location is identified 1332 either directly by, for example, sampling the audio and/or by the internal synchronization clock. Once a request location 1332 is identified, the item data is queried (e.g., a plurality of segment definitions are searched) to identify segment definitions that are responsive to the request location and the second screen functions that are activated 1333. If a responsive segment definition is found 1333, then item information associated with a responsive segment definition is retrieved and displayed 1335. Item information may have been already retrieved and loaded into processing memory, and, thus, retrieval is from the memory of the second screen. Alternatively, the item information is retrieved from any of a variety of storage memories, local devices, or remote locations as needed. Herein, the term "retrieve" should be understood in the broadest sense and comprises obtain, acquire, procure, download, transfer, extract, and to come into possession by any means or methodology from a local and/or remote source.

When a user requests item information for an item that was no longer being depicted, a segment definition may not be found that is responsive to the request location 1332. In such situations, a proper message is displayed (e.g., item information not available for this location). Alternatively, a number of methodologies may be implemented to provide item information 1335 for a most recently depicted item for which item information is available 1334. For example, segment definitions are searched to identify a segment definition that has an ending point prior to and closest to, within certain parameters, the request location.

If a user requests additional item information 1340 relating to displayed item information, then the display of additional item information is enabled 1341 in response to the request for additional item information. Termination of the display of additional item information 1342 returns to the screen/menu providing multiple item information 1335. This would be particularly advantageous where multiple item information is displayed. Alternatively, termination of the display of additional item information 1341 restores the function notification activation routines 1321. A termination of the display of additional item information may take many forms, such as exiting the additional information function (e.g. exiting a website, and exit or escape request). If a user does not request additional item information relating to displayed item information 1340, then the function notification activation routines 1321 are restored, unless the user elects to exit the application 1351.

The flow chart of FIG. 13 has been intentionally drafted to disclose a number of possible embodiments. A number of permutations, combinations, substitutions, and/or additions in the specific steps, and recursive functions may be initiated at different points in the process than those illustrated. In an exemplary second screen embodiment, the item indication 1324, item information 1335, and/or additional item information 1341, elements of in-video functions are displayed on the second screen.

It is noted that while certain exemplary embodiments are detailed, directly or by incorporation, for certain second screen functions, the inventions are not limited to the exemplary data elements utilized in any function or specific embodiment. An advantage of a particular second screen embodiment, feature, or element is not necessarily limited to that particular second screen embodiment, feature, or element. As the exemplary embodiments demonstrate, a method or step that is disclosed with respect to a certain second screen embodiment may be similarly implemented in other second screen embodiments. Many variations of the elements included in a particular second screen embodiment are possible by way of permutation, combination, substitution, deletion, and/or additions. A feature or in-video function may be enhanced by the addition of data elements (e.g., segment definitions, frame identification, play position identification, image and thumbnail identifiers, write-ups, and linkages) detailed with respect to other features or in-video functions. A video map addressing the various features and functions detailed herein provides a great database of additional information that may be mined to support the features, in-video functions, second screen functions, and playback functions. The applicability of the "and/or" concept is not limited to the explicit instances where the terms "and/or" are used. The explicit use of the terms "and/or" serves to underscore the available permutations.

The teachings disclosed herein, directly and indirectly by, for example, incorporation, are intended to show a variety of architectures, services, capabilities, systems, methods, and inventive elements which are combined and may be combined to suit particular embodiments. While a function of incorporation is to provide additional detail explanation, the synergies among and between the various inventive elements is a significant feature of and object of incorporation. The incorporation by reference at a specific place within the specification is not intended to limit the extent to which the reference is incorporated, or the manner in which it may be integrated. Where a teaching may be deemed to be at cross purposes, or otherwise incompatible, with some other teaching, it ought to be understood as a possible alternative to be utilized as a particular preferred embodiment may require.

While elements of the inventions have been detailed in conjunction with specific embodiments thereof, it is evident that many alternatives, modifications and variations are possible and will be apparent to those skilled in the art in light of the foregoing descriptions. Accordingly, it is intended to embrace all such alternatives, modifications, variations, and combinations as fall within the spirit and broad scope of the specification. The teachings that have been cited and incorporated herein are offered by way of example, and not limitation, of the underlying foundation of knowledge and skill that is available to a person of ordinary skill in the art. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. An information display method comprising: downloading, over a communications network, a trivia question, a set of multiple choice answers, an identification of a correct answer, and a write-up relating to the trivia question; receiving synchronizing information that is responsive to a playing of the video on a primary screen device; establishing, responsive to the synchronizing information, a synchronization to the playing of the video; identifying a commercial break during the playing of the video; displaying, on a second screen device and during the identified commercial break, the trivia question and the set of multiple choice answers, the displaying being responsive to a user's preestablished preference with respect to a depiction of commercials during a playing of a video, the trivia question being unrelated to a commercial currently depicted during the commercial break; and displaying, responsive to receiving a user's selection from the set of multiple choice answers, the identification of the correct answer and the write-up relating to the trivia question.

2. An information display method comprising: downloading, over a communications network, a trivia question, a set of multiple choice answers, and an identification of a correct answer; receiving synchronizing information that is responsive to a playing of a video on a primary screen device; establishing, responsive to the synchronizing information, a synchronization to the playing of the video; identifying a commercial break during the playing of the video; displaying, on a second screen device and during the identified commercial break, the trivia question and the set of multiple choice answers, the displaying being responsive to a user's preestablished preference with respect to a depiction of commercials during a playing of a video, the trivia question being unrelated to a commercial currently depicted during the commercial break; and displaying, responsive to receiving a user's selection from the set of multiple choice answers, the identification of the correct answer.

3. The method of claim 2, wherein the receiving synchronizing information comprises receiving, from the primary screen device, an identification of a play position in the video playing on the primary screen device.

4. The method of claim 2, wherein the receiving synchronizing information comprises receiving audio information principally from the playing of the video on the primary screen device; and wherein the establishing the synchronization to the playing of the video comprises generating an acoustic fingerprint responsive to the received audio information, and comparing the acoustic fingerprint to a downloaded acoustic database to obtain an identification of a play position in the video playing on the primary screen.

5. The method of claim 2, wherein the downloading further comprises downloading a linkage to a remote source of additional information relating to the trivia question, and wherein the displaying of the identification of the correct answer further comprises displaying the additional information.

6. The method of claim 2, wherein the user's selection from the set of multiple choice answers is responsive to a time limit.

7. The method of claim 2, wherein the downloading further comprises downloading a linkage to a remote source of additional information relating to the trivia question, and wherein the displaying of the identification of the correct answer further comprises displaying an indication of the availability of additional information.

8. The method of claim 2, wherein the trivia question, that is unrelated to the commercial currently depicted during the commercial break, is related to content recently depicted in the playing of the video.

9. An information display method comprising: receiving, on a second screen device, a user's request for a display of a trivia question; downloading, over a communications network, a trivia question, a set of multiple choice answers, and an identification of a correct answer; displaying, on a second screen device, during a commercial break in a playing of a video on a primary screen device, the trivia question and the set of multiple choice answers, the displaying being responsive to a user's preestablished preference with respect to a depiction of commercials during a playing of a video, the trivia question being unrelated to a commercial currently depicted during the commercial break; and displaying, responsive to receiving a user's selection from the set of multiple choice answers, the identification of the correct answer.

10. The method of claim 9, wherein the user's selection from the set of multiple choice answers is responsive to a time limit.

11. An information display method comprising: downloading, over a communications network, trivia information; identifying a commercial break during a playing of a video on a primary screen device; and displaying, on a second screen device and during the identified commercial break, the trivia information, the displaying being responsive to a user's preestablished preference with respect to a depiction of commercials during a playing of a video, the trivia information being unrelated to a commercial currently depicted during the commercial break.

12. The method of claim 11, wherein the downloading further comprises downloading a linkage to a remote source of additional information relating to the trivia information, and wherein the display of trivia information further comprises displaying an indication of the availability of additional information.

13. A second screen device comprising: a communication interface for downloading, over a communications network and to a memory of the second screen device, a trivia question, a set of multiple choice answers, and an identification of a correct answer; a processor for identifying a commercial break during a playing of a video on a primary screen device, for activating, on a display screen, a display, during the identified commercial break, of the trivia question and the set of multiple choice answers, the display being responsive to a user's preestablished preference with respect to a depiction of commercials during a playing of a video, the trivia question being unrelated to a commercial currently depicted during the commercial break, and for activating, responsive to receiving a user's selection from the set of multiple choice answers, a display of the identification of the correct answer.

14. The device of claim 13, wherein the downloading further comprises downloading a write-up relating to the trivia question; and wherein the display of the identification of the correct answer further comprises a display of the write-up.

15. The device of claim 13, wherein the trivia question, that is unrelated to the commercial currently depicted during the commercial break, is related to content recently depicted in the playing of the video.

16. The device of claim 13, wherein the downloading further comprises downloading a linkage to a remote source of additional information relating to the trivia question, and wherein the display of the identification of the correct answer further comprises displaying the additional information.

17. The device of claim 13, wherein the user's selection from the set of multiple choice answers is responsive to a time limit.

18. An information provider system comprising: a memory for storing data comprising a trivia question, a set of multiple choice answers; a communications interface for downloading the data over a communications network to a second screen device; a processor for causing a downloading of the data to a second screen device, whereby the second screen device is able to identify a commercial break during a playing of a video on a primary screen device, and is able to display, during the identified commercial break, the trivia question and the set of multiple choice answers, the display being responsive to a user's preestablished preference with respect to a depiction of commercials during a playing of a video, the trivia question being unrelated to a commercial currently depicted during the commercial break.

19. The system of claim 18, wherein the data further comprises a linkage to a remote source of additional information relating to the trivia question, and wherein the display, during the identified commercial break, further comprises displaying the additional information.

20. The system of claim 18, wherein the trivia question, that is unrelated to the commercial currently depicted during the commercial break, is related to content recently depicted in the playing of the video.

* * * * *